US012567058B2

(12) United States Patent
Roberts

(10) Patent No.: US 12,567,058 B2
(45) Date of Patent: Mar. 3, 2026

(54) SYSTEMS AND METHODS FOR ISSUING PROCESSOR AGGREGATION

(71) Applicant: Simnang IP, LLC, Farmington, UT (US)

(72) Inventor: Rhett M. Roberts, Kaysville, UT (US)

(73) Assignee: Simnang IP, LLC, Farmington, UT (US)

( * ) Notice: Subject to any disclaimer, the term of this patent is extended or adjusted under 35 U.S.C. 154(b) by 139 days.

(21) Appl. No.: 18/490,626

(22) Filed: Oct. 19, 2023

(65) Prior Publication Data

US 2025/0131412 A1  Apr. 24, 2025

(51) Int. Cl.
*G06Q 20/20* (2012.01)
*G06Q 20/34* (2012.01)
*G06Q 20/40* (2012.01)

(52) U.S. Cl.
CPC ................................ *G06Q 20/354* (2013.01)

(58) Field of Classification Search
CPC .... G06Q 20/354; G06Q 20/20; G06Q 20/355; G06Q 20/401
USPC ......................................................... 705/35
See application file for complete search history.

(56) References Cited

U.S. PATENT DOCUMENTS

| | | | |
|---|---|---|---|
| 7,693,783 B2 * | 4/2010 | Balasubramanian .. | G06Q 40/00 235/382 |
| 8,464,938 B2 | 6/2013 | Briscoe et al. | |
| 10,026,089 B2 | 7/2018 | Ford et al. | |
| 10,339,553 B2 | 7/2019 | Ovick et al. | |
| 2014/0372315 A1 * | 12/2014 | Faith .................... | G06Q 20/401 705/44 |
| 2016/0140558 A1 * | 5/2016 | Groarke ............... | G06Q 20/405 705/44 |
| 2022/0012698 A1 * | 1/2022 | Kohli ................. | G06Q 20/3674 |
| 2025/0045758 A1 * | 2/2025 | Zhou ..................... | G06Q 40/04 |

* cited by examiner

*Primary Examiner* — Clifford B Madamba
(74) *Attorney, Agent, or Firm* — Foley & Lardner LLP

(57) ABSTRACT

Systems, methods, and computer-readable storage media for issuing processor aggregation are provided. Issuing processor integration interfaces can be specific to a corresponding issuing processor systems. Each issuing processor integration interface can include one or more issuer entities for card data, the card data for card creation and management within the corresponding issuing processor system. The issuer entities can be for customer data specific to the corresponding issuing processor system, and for credentials for an issuer account. One or more card records can correspond to resources for instantiating a card, modifying functionality of the card, and managing cards. Cards can be operable with a card network through an issuing processor system. Uniform receiving of data from and transmitting of data to the plurality of issuing processor systems is further provided.

15 Claims, 8 Drawing Sheets

SYSTEMS AND METHODS FOR ISSUING PROCESSOR AGGREGATION

BACKGROUND

The present disclosure relates generally to the field of issuing processor aggregation. In a computer networked environment, such as the Internet, users, and entities such as people or companies participate in exchanges. The exchanges may involve terms that indicate how a computer is to process and/or update data for the exchanges over time. Various issuing processors can interface with various card networks to effect exchanges. The various issuing processors implement varying functionality, operations, or data conveyances. For example, one issuing processor can implement a function differently, omit a function, or implement different or additional functions compared with another issuing processor. Examples of such functions can include processing exchanges, issuing new cards, conveying various information between systems, etc.

SUMMARY

Systems and methods are disclosed for issuing processor aggregation. A system can implement various issuing processor integration interfaces to connect to or with various issuing processors. The issuing processor integration interfaces can be instantiated by an application executed on a first computing device. The issuing processor integration interfaces of the application can implement card management. Card management can include exchange management (e.g., transaction processing). Card management can include card administrative management, such as card generation, or subsequent administration, such as various adjustments associated with a card program or an individual account. The issuing processor integration interfaces can couple (e.g., via one or more application programming interfaces (APIs)) with the issuing processors and a uniform entity to exchange data therebetween, incident to card administration. For example, the uniform entity can be configured to correspond to a relational data structure of an electronic ledger such that the issuing processor integration interfaces translate issuer entities (e.g., one or more data structures) received from the issuing processors to the uniform interface. The translation can include generation of new information, or consolidation of information distributed throughout a network. The translation can enable the application hosting the issuing processor integration interfaces to operate as middleware between separate issuing processor computing systems and another computing system to translate data into a uniform format and configuration with enriched values that the computing system can locally process in the computing system's own processes.

Figure 1:
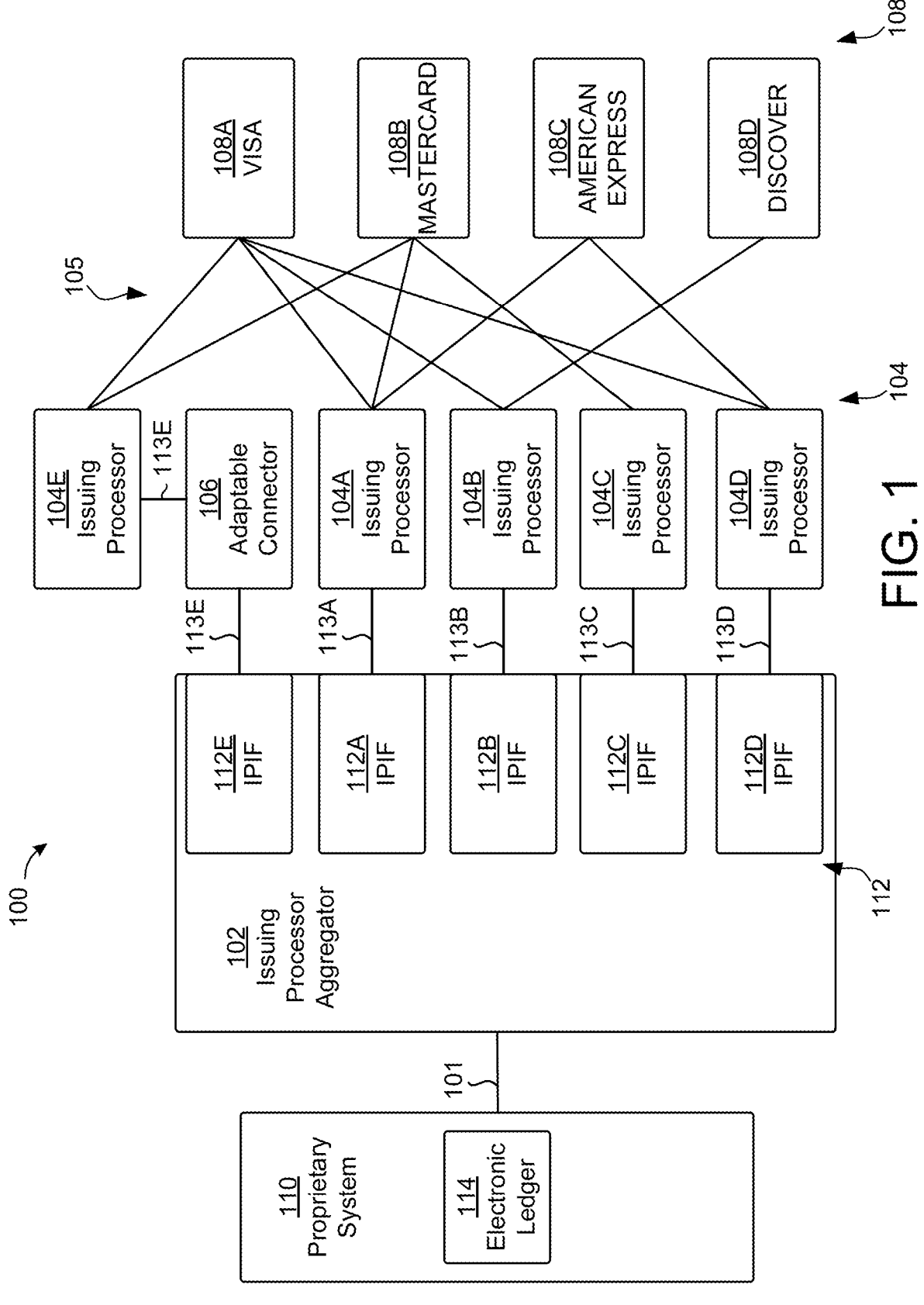
FIG. 1 is a block diagram depicting an implementation of a system including an issuing processor aggregator, according to some implementations.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The systems and methods described herein relate to issuer aggregation. A system can connect to different issuing processors that each have their own systems for card management. Card management can include card creation (e.g., issuing/instantiation) or other card administration such as changes to daily spend limits, whitelisted/blacklisted merchant category codes, address changes, card expiry management, or so forth. Card management can be performed incident to one or more card programs. For example, a card management function can be defined by or based on the card program. Each issuing processor can support or implement different features. For example, some issuing processors can implement varying exchange hold periods (e.g., 3 days, 7 days, or a dynamic hold based on various risk parameters). Similarly, some issuing processors can implement partial or incremental authorizations such as to process an amount less than a requested amount. Further, some issuing processors can implement varying settlement periods, chargeback handling data, fraud management or scoring, webhooks for technical integration, or so forth. Moreover, some issuing processors can include one or more reward or loyalty programs, which can include a provision of information related to a purchased item (e.g., to distinguish between an exchange, or portion thereof, associated with a purchase of retail merchandise from a gift card, stamp, service, or other exchange item, wherein the reward or loyalty program may discriminate therebetween).

Each issuing processor can include issuer entities (e.g., data structures). The issuer entities can have one or more data fields associated with features which are exclusive thereto, or which are uncommon to other issuing processors. For example, an issuer entity can include differently formatted, additional, lesser, or different data fields corresponding to varying features. Thus, a field of a uniform interface may not correspond to a field of an issuer entity. For example, a uniform interface can include a zip code field; an issuer entity can include a latitude and longitude of an exchange (e.g., a transaction), which can be used in combination with a card present bit indication to determine an exchange location, which may not include a zip code. Systems which do not include corresponding fields may not provide fields necessary to various operations such as authorizing, modifying, or settling exchanges, issuing or cancelling cards, or so forth. In another example, the issuer entity can include a travel notification, card embossing text or information, loyalty program ID which may not be present at the uniform interface. An issuing processor integration interface can include a connection to a data source, such as a data enrichment server to generate information not directly available from the proprietary system or the issuing processor. An issuing processor integration interface can effect various transformations, concatenations, supplementations, or other operations to translate information exchanged between different issuing processors and the proprietary system.

Various systems, such as a proprietary system including an electronic ledger, can interface with the various issuing processors. Such systems may be designed according to a tightly coupled interface. For example, in addition to implementation details to connect the interfaces, some information associated with an issuing processor may be absent at an electronic ledger, and some information associated with the electronic ledger may be absent as received from an issuing processor. For example, the electronic ledger can include a nested set of relationships between programs, cardholders, exchanges, or so forth, such that the operation of the electronic ledger depends upon a receipt of issuer entity data. Such tightly coupled interfaces may not be readily or practically ported to other issuing processors, or may face difficulties in connecting to an exchange network (e.g., card network). For example, an issuing processor may not couple to every card network (e.g., may omit or drop support for a card network), such that an interface to the issuing processor may become deprecated, and a new interface is generated (which, in turn, includes a different issuer entity suffering from the same portability issues as the first interface).

A card can be created or managed according to a card program. For example, a card program for a retailer can include one or more daily spend limits, restrictions according to any card or exchange (e.g., transaction) attribute, such as an MCC or geolocation (e.g., outside of the United States), or other features. Merely for ease of description, various features are referred to as program features which may be implemented across any number of accounts. For example, a card program associated with a retailer can implement various program features as indicated by the retailer, and may include a common daily spend limit MCC spend limit, geographical restriction, or the like. According to some implementations of the present disclosure, any of the program features may be implemented for an individual account without reference to a program, or cards associated with programs can have particular features adjusted. For example, the daily spend limit, described above, may be based on individual cardholder characteristics or adjusted responsive to user requests.

As used herein, a "card" can refer to or correspond to an account corresponding to one or more ledgers, or a physical or virtual token or identification method associated therewith. For example, a card can correspond to a physical credit, debit, or other stored value account. The card may correspond to a virtual card of a mobile wallet, or other stored value account. A card can refer to a token used according to a physical presence of a token (e.g., mobile wallet or credit card). A card can refer to another operative connection, such as a token (e.g., account number, virtual account number, or other information) provided via a wired or wireless network. A card can refer to a reference to pre-communicated information, such as an indication to process an exchange based on previously converted credentials (e.g., a saved payment card).

As used herein, "exchange management" can refer to managing exchanges associated with the various issuing processors. For example, exchange management can refer to processing authorization or pre-authorization requests (sometimes colloquially referred to as "swipes" but which can refer to various information provisions such as according to an NFC payment device, online credential conveyances, or so forth). Exchange management can refer to various other actions associated with a prior swipe such as exchange (e.g., transaction) reversals, settlement, cancelations, or so forth.

As used herein, an "issuer entity" is any data structure or combination thereof, associated with an issuer. For example, the issuer entity be or include a data object (e.g., file, relational database, strings, JSON objects, XML files, other documents, etc.), a data field, or a combination thereof. The issuer entity can be sourced, derived, or generated based on a code base or API (e.g., controls or rules) of an issuing processor, or a parameter (e.g., spending limits or account numbers), associated therewith. In some embodiments, the issuer entity for each issuing processor can be or include a separate API. The issuer entity can relate to card creation (e.g., issuance/instantiation), other card administrative functions, or to exchange management. For example, the issuer entity can relate to various card fields, such as fields which are associated with one or more card programs, such as to define one or more card features, limits, depictions, or other attribute(s). Such fields can be provided incident to generating a card (e.g., requesting card creation) or maintaining the card (e.g., adjusting or communicating the various card fields). The issuer entity can be associated with an issuer account, referring to an account associated with one or more cards associated with an issuing processor. For example, the issuing account can be accessible via credentials associated with the issuer entity.

As used herein, a "resource" is a component of computational functionality accessible to one or more component of the systems and methods disclosed herein. For example, a resource can include a hardware resource (e.g., circuit), a software resource (e.g., instructions or data mappings stored on a non-volatile memory), a data resource (e.g., information of a data repository). Some resources may further specify an attribute thereof, such as a shared resource (e.g., a resource accessible by two or more components), a network resource (e.g., a resource associated with networked components, such as bandwidth, IP address rages, or server loading), or a virtual resources (e.g., a resource implemented or scaled according to a demand therefor). For example, resources for instantiating, modifying, or managing a card can include various hardware circuits, instructions, or other information used to achieve such instantiation, modification, or management.

FIG. 1 is a block diagram of a system 100 including an issuing processor aggregator 102. The issuing processor aggregator 102 can aggregate interfaces to issuing processors 104. Issuing processors 104 can, in turn, implement connections to various card networks 108. For example, to implement a card program, information should be exchanged over a connection to an issuing processor 104. However, various issuing processors 104 can include computing systems which include differing data, differing data formats, or differing functions. Thus, it may be difficult for a system to interface between various issuing processors 104. For example, where different issuing processors 104 are connected to different networks, a computing system may interoperate with multiple issuing processors 104, or incident to a selection of a new issuing processor, a computing system may be migrated between issuing processors 104. However, once integrated with a first issuing processor 104, it may be difficult to migrate to another.

To overcome the aforementioned technical deficiencies, the issuing processor aggregator 102 can operate as middleware between a computing system and any number of issuing processors 104. For example, the issuing processor aggregator 102 can include various interfaces (e.g., issuing processor integration interfaces (IPIFs) 112, connections, etc.). The interfaces can be or can include API's, push or pull notification systems, data repositories accessible by an issuing processor 104, combinations thereof, or the like. The issuing processor aggregator 102 can communicate across the various interfaces by translating data into a format that matches an interface. Such translation can include generating or enriching data, translating information, or performing multiple operations for one issuing processor 104 to match a same functionality as another issuing processor 104, in a manner which is transparent to a computing device (e.g., at a uniform interface 101). For example, the issuing processor aggregator 102 can convert various data of an issuer entity to a uniform format (e.g., JSON) that can be used to update an electronic ledger 114 hosted on a remote computer system (e.g., the proprietary system). For example, the electronic ledger can include a nested data structure relating to cardholders, accounts, exchanges, and so forth.

The issuing processor aggregator 102 connects to a first issuing processor 104A, second issuing processor 104B, third issuing processor 104C, fourth issuing processor 104D, and fifth issuing processor 104E (collectively, issuing processors 104, also referred to as issuer processors 104, without limiting effect). The various issuing processors 104 can, in turn, connect to various networks referred to collectively as card networks 108. Particularly, the depicted system 100 includes the non-limiting illustrative examples of a VISA® network 108A, MasterCard® network 108B, American Express® network 108C, and Discover® network 108D. Each issuing processor 104 can connect to any number of card networks 108 over a respective connection 105 thereto. For example, as depicted, various issuing processors 104 may connect to at least one of the card networks 108 and/or may omit a connection to one or more card networks 108. A proprietary system 110, such as a merchant-related component of a POS device or a computer hosting an electronic ledger for the different issuing processors 104 can interface with one issuing processors 104, via the issuing processor aggregator 102, or can connect to more than one issuing processor 104 (e.g., to connect to an omitted network) or may not process exchanges associated with such networks.

An electronic ledger 114 is depicted as constituent to a proprietary system 110. According to various embodiments, the electronic ledger 114 can couple to various system 100 components. The various components of the proprietary system 110 (e.g., the electronic ledger 114) can be associated with a uniform interface 101. However, as indicated above, the various issuing processor connections 113, can vary from each other and from the uniform interface 101. Thus, various issuing processor integration interfaces (IPIF) 112 can intermediate a corresponding issuing processor 104 from the uniform interface 101. The IPIF 112 can adapt, translate, generate, supplement, enrich, or otherwise retrieve information from various sources to adapt an entity (e.g., one or more data structures) between the issuing processor 104 and the uniform interface 101. For example, the adaptation can include a translation for a uniform interface 101 associated with the electronic ledger 114 of FIG. 1.

The uniform interface 101 can include an application programming interface (API) which can be configured to receive data according to a pre-determined format. For example, the uniform interface 101 can arrange information according to JSON, XML, or other format. The issuing processor aggregator 102 can exchange information with the uniform interface 101 (e.g., receive from, or convey to). For example, the issuing processor aggregator 102 can retrieve data of an issuer entity from other connections including other APIs, FTP sites, or other repositories, push notification, emails, or other data conveyance paths and adapt said data to the uniform interface.

Each proprietary system (e.g., merchant) can instantiate a separate instance of the issuing processor aggregator 102, such that merchant information contained within the issuing processor aggregator 102 is segregated from other merchants. The depicted instance of the issuing processor aggregator 102 couples to the various issuing processors 104 via respective connections. For example, various connections shown as direction connections, such as a first connection 113A between the first issuing processor 104A and the first IPIF 112A can include a logically direct connection (e.g., an issuer entity portion conveyed by the first IPIF 112A can be the same as is received by the issuing processors 104). Such connections can include various intermediary devices such as switches, routers, cables, or so forth, which can include appendages or concatenations of various checksums, framing or packetizing padding or data, or so forth. As depicted, a second connection 113B between a second IPIF 112B and a second issuing processor 104B; third connection 113C between a third IPIF 112C and a third issuing processor 104C; or fourth connection 113D between a fourth IPIF 112D and a fourth issuing processor 104D can likewise interface without logical intermediation. The various IPIF 112A, 112B, 112C, 112D, 112E may be referred to, collectively, as IPIF 112.

According to the present disclosure, the issuing processor aggregator 102 can implement one or more interfaces to couple to any number of issuing processors. One or more interfaces generated by the issuing processor aggregator 102 can be configured to couple to an adaptable connector 106 to connect to the issuing processor 104. For example, the adaptable connector 106 can implement any of the translations (e.g., generations) discussed herein. That is, the adaptable connector 106 may be adaptable to a previously generated interface, and may further provide a connector for a uniform interface 101. For example, the adaptable connector 106 can implement a data enrichment operation, such as by comparing a predefined list of merchants to a location, MCC, or other issuer entity.

In some embodiments, the adaptable connector 106 can be or include an application operating on an external computing device from the issuing processor aggregator 102. The adaptable connector 106 can operate as middleware between the issuing processor aggregator 102 and the issuing processor 104E. In doing so, the adaptable connector 106 can transfer data between the issuing processor 104 and the issuing processor aggregator 102 (e.g., through the IPIF 112E), in some cases without any modification. Such can be advantageous, for example, when systems connect with the issuing processor aggregator 102 that already are connected to an issuing processor. Such systems can operate to route communication between the issuing processor aggregator 102 and the issuing processor to perform different functions, such as to complete exchanges.

As depicted, and in some embodiments, the adaptable connector 106 intermediates a fifth connection 113E between the fifth IPIF 112E and a fifth issuing processor 104E. The adaptable connector 106 can perform any of the operations of the various IPIF 112. For example, the adaptable connector 106 can perform a first portion of enrichment operations for translations between the various exchanges and the uniform interface 101, and the fifth IPIF 112E can perform any additional or further operations. For example, the issuing processor aggregator 102 can lack a connection 113 to directly interface with the fifth issuing processor 104E, and a merchant can include a pre-defined interface to couple to an issuing processor 104. The pre-defined interface can include various connectors to data enrichment tables, servers, or other data sources for an issuer entity such that including a connection to the adaptable connector 106 can provide a translator to the uniform interface with obviates at least some operations of architecting an IPIF 112E to couple directly to the fifth issuing processor 104E (e.g., defining or consolidating data sources to generate instances of the issuer entity which are mappable or translatable to the uniform interface).

Each system or device in the computing environment may include one or more processors, memories, network interfaces (sometimes referred to herein as a "network circuit") and user interfaces. The memory may store programming logic that, when executed by the processor, controls the operation of the corresponding computing system or device. The memory may also store data in databases. For example, the system 100, or the various components thereof can include one or more components or structures of functionality of computing devices depicted in FIG. 8. The network interfaces may allow the computing systems and devices to communicate wirelessly or otherwise, e.g., via a network. The various components of devices in the computing environment may be implemented via hardware (e.g., circuitry), software (e.g., executable code), or any combination thereof. Systems, devices, and components in FIG. 1 can be added, deleted, integrated, separated, and/or rearranged in various embodiments of the disclosure.

Figure 2:
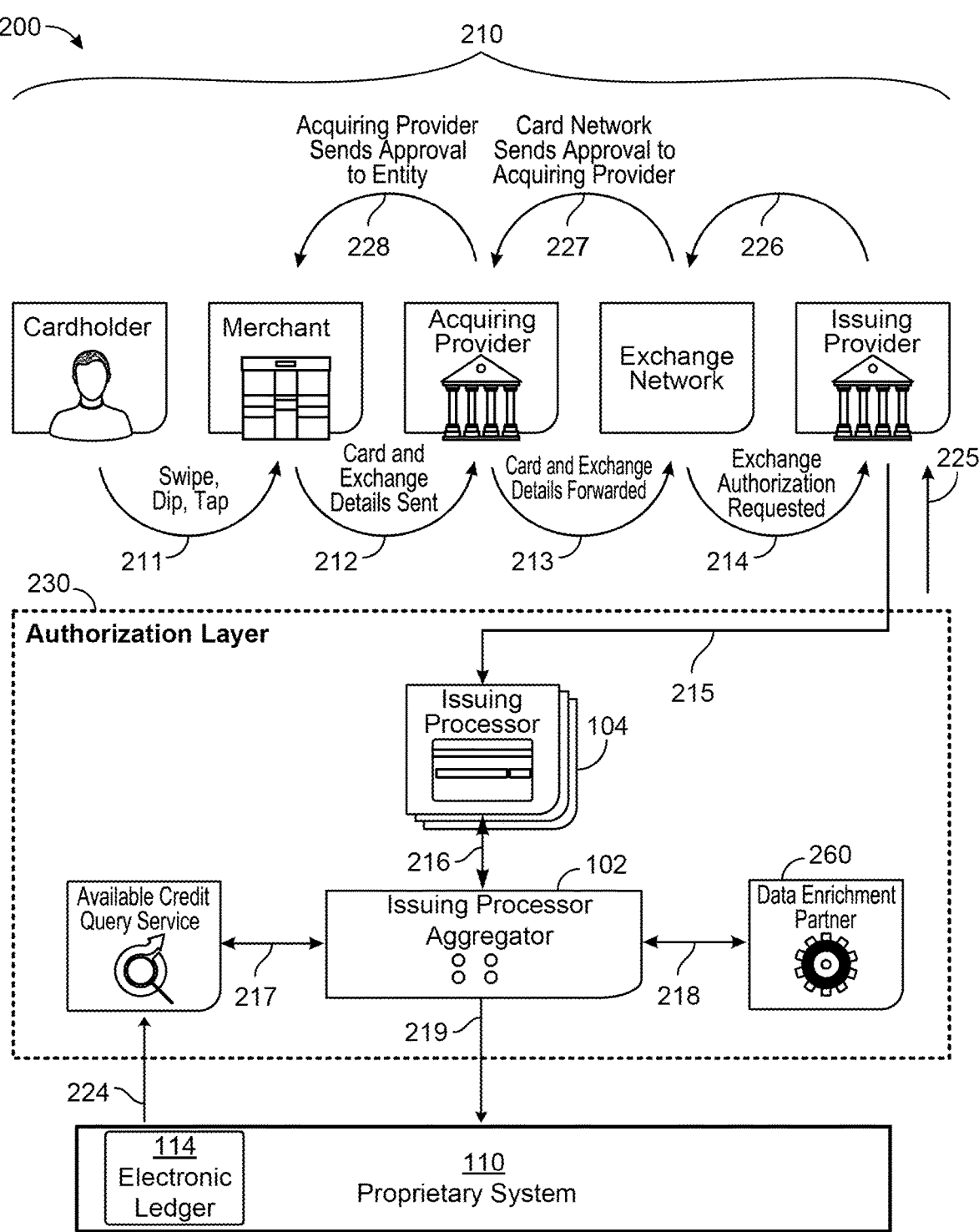
FIG. 2 is a system architecture for aggregating issuing processors, according to some implementations.

FIG. 2 is a system architecture 200 for aggregating issuing processors 104, according to some implementations. The system architecture 200 depicts the process of a cardholder performing an exchange and the components of an authorization layer 230 (in particular, issuing processors 104 and an issuing processor aggregator 102) receiving exchange data from a provider for processing the exchange. A computing environment 210 depicts the process of exchanging information between the cardholder, merchant, providers and card networks 108. For example, at 211 the user can perform a swipe action (e.g., dip, tap or otherwise provide card information to a merchant), such as by interfacing a physical card or mobile wallet with a point of sale (POS) terminal. At 212, the card and exchange details (or data) can be sent to an acquiring provider (e.g., acquiring financial institution (FI)). At 213, the acquiring provider can forward the card information (or other requital form) and exchange details to a card network 108, and at 214 the card network 108 can request, from an issuing provider, an exchange authorization (e.g., authorizing the exchange).

It will be understood that the description of the 215-225 described herein may be executed by an issuing processor aggregator 102 and devices connected thereto, in particular, issuing processors 104, a data enrichment source 260 and an authorization service. The authorization service can include at least a service to query an available credit, based on an electronic ledger 114 of the proprietary system 110. In general, the authorization layer 230 includes processing of the exchange after the exchange authorization is requested. The authorization can be performed by, for example, one or more components of the system of FIG. 1. At 215, the issuing provider can provide to the issuing processor 104, exchange data of an exchange. In some implementations, at 215, the issuing processor can query the issuing provider on a periodic basis for new changes. At 216, the exchange and exchange data can be encrypted and/or a secure communication channel (e.g., secure socket layer (SSL), transport layer security (TLS), etc.) can be established between the issuing provider and proprietary system 110. With continued reference to 216, an issuer entity (e.g., data fields, data structures, information disposed within computer-readable instructions, or other information associated with card creation, administrative functions, or exchange management) can be exchanged over a connection between the issuing processor 104 and the issuing processor aggregator 102. The issuer entity can be exchanged according to one or more messages over one or more communications channels, such as an encrypted channel, as provided above. The messages can be provided as point to point messages, or by a provision of any number of data fields of an issuer entity to a shared resource (e.g., a shared memory, a mutually accessible server location, or another data repository).

At 217, the exchange data can be cross-referenced with an available balance query service to determine an available balance associated with received card information. The service can base the available balance on an available balance of an electronic ledger 114 of a proprietary system 110, or on card data (e.g., program data) associated with a card. For example, an exchange exceeding an exchange limit, daily spend limit, MCC category limit, or located in a restricted area may be indicative of a non-approval, even where an available balance exceeds an exchange amount.

At 218, the exchange data can be augmented or enriched with additional data (or supplemental data) from a data enrichment source(s) (or partner) 260. The additional data may, for example, provide additional information about a merchant or other participant to an exchange. The additional information can enable additional searching, sorting, routing, etc. of an exchange according to additional features or attributes. Additionally or alternatively, at 218, the exchange data can be sent (e.g., securely) to the data enrichment source(s) 260 to scrub and/or clean (e.g., fixing incorrect, incomplete, duplicate or otherwise erroneous data in the data set, detecting and correcting corrupt or inaccurate records from a record set, table, or database and by incomplete, incorrect, inaccurate, or irrelevant parts of the data and then replacing, modifying, or deleting the dirty or coarse data). The data enrichment source 260 can be a component of the system, or may otherwise be connected thereto. For example, the data enrichment source(s) can be or include a look-up table hosted by a same computing device as other system components (e.g., the issuing processor aggregator 102), or a remote device operated by a third party partner.

At 219, the exchange can be posted or sent to the proprietary system 110. The proprietary system 110 can perform any number of operations based on the receipt of the exchange data, such as adjustment or appendage to the electronic ledger 114. For example, the proprietary system 110 can adjust an available balance, number of exchanges per day, exchange history, or other information. The proprietary system 110 can also generate, at 224, information associated with the exchange data, such as an indication that an exchange amount does not exceed an available balance, that a geolocation associated with the exchange is not restricted, or that an associated MCC is not restricted. Such indications can be provided according to an explicit indication or an indication of authorization or non-authorization. At 225, the issuing provider can be provided a response. The response can include an indication the exchange was successfully recorded (e.g., an approval) in a table. At 226, the issuing provider sends approval to a card network 108. At 227, the card network can send an approval to the acquiring provider. At 228, the acquiring provider can send the approval to the merchant.

The receipt of the approval, by the merchant, can be received prior to an expiration of a predefined time. For example, the merchant can include a timeout such that the merchant can locally reject an exchange upon the predefined time (e.g., five seconds) elapsing. Such a technique can improve operational security, such as to reduce a time used by a man-in-the-middle attack which may incur further delay. However, the various operations can include operations across a network which are not generally completed prior to the elapsing of the predefined time. For example, the issuing processor aggregator 102 can gather data from various data sources associated with an issuer entity and convey the issuer entity to the proprietary system over a uniform interface. The uniform interface can be configured to reduce a number of operations performed by the proprietary system 110, such as by providing the issuer entity according to a same data structure (e.g., an electronic data structure) as the electronic ledger. That is, the conveyance of information at 219 can include a conveyance of information over a uniform interface. Such a retrieval of disaggregated system and provision of data corresponding to the electronic ledger 114 of the proprietary system 110 can reduce latency of communication, such that the exchange can process prior to an expiration of the exchange at the merchant POS.

Figure 3:
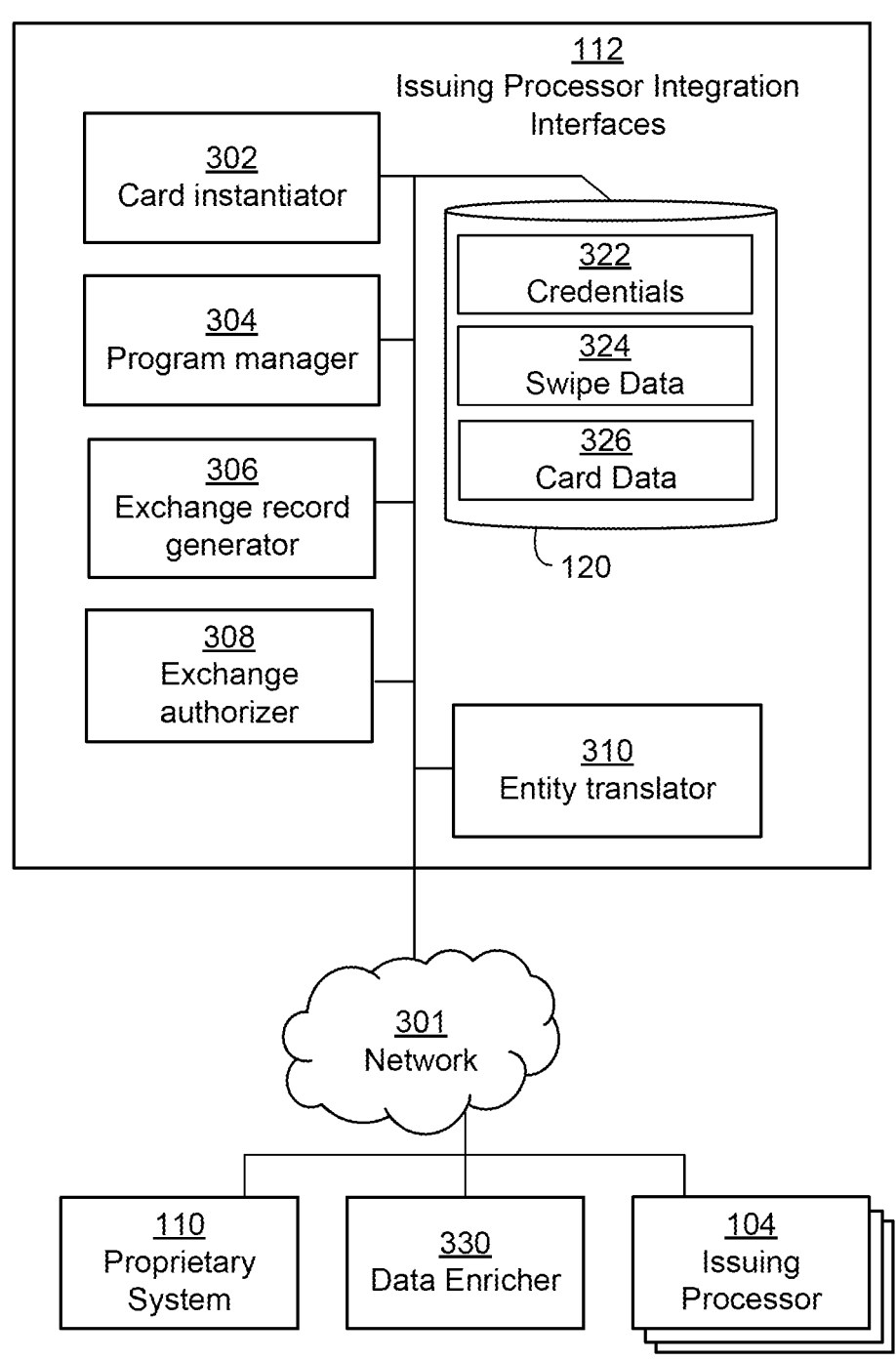
FIG. 3 is a block diagram of an issuing processor aggregator interface of an issuing processor aggregator, according to some implementations.

FIG. 3 is a block diagram of an issuing processor aggregator interface (IPIF) 112 of an issuing processor aggregator 102, according to some implementations. The IPIF 112 can include or interface with at least one card instantiator 302. The IPIF 112 can include or interface with at least one program manager 304. The IPIF 112 can include or interface with at least one exchange record generator 306. The IPIF 112 can include or interface with at least one exchange authorizer 308. The IPIF 112 can include or interface with at least one entity translator 310. The card instantiator 302, program manager 304, exchange record generator 306, exchange authorizer 308, or entity translator 310 can each include at least one processing unit or other logic device such as programmable logic array engine, or module configured to communicate with a data repository 320 or database. The card instantiator 302, program manager 304, exchange record generator 306, exchange authorizer 308, or entity translator 310 can be separate components, a single component, or part of the issuing processor aggregator 102, and can include or interface with, or be components of, the system 100 of FIG. 1. The IPIF 112 or can include hardware elements, such as one or more processors, logic devices, or circuits. For example, the IPIF 112, like other components of the system 100 of FIG. 1, can include one or more components or structures of functionality of computing devices depicted in FIG. 8.

The various components of the IPIF 112 can be in network communication via a Peripheral Component Interconnect Express (PCIe) network 301, Ethernet network 301, wireless fidelity (Wi-Fi) network 301, combinations thereof, or the like, including any number of other wired or wireless networks 301. Moreover, the network 301 can interface with various other components such as a cloud based portion of a data repository 320. The network 301 can include computer networks such as the Internet, local, wide, metro, or other area networks, intranets, cellular networks, satellite networks, and other communication networks such as Bluetooth, or data mobile telephone networks. The network 301 can be public or private. The various elements of the system 100 can communicate over the network 301.

The data repository 320 can include one or more local or distributed databases, and can include a database management system. For example, the data repository 320 can include credentials 322, swipe data 324, or card data 326 (e.g., card records).

A credential 322 may refer to or include a token, user name/password combination, or other indication of authentication or authorization. For example, the credentials 322 can be associated with a card program corresponding to one or more cards, wherein a representation of an electronic ledger 114 or information associated therewith (e.g., any other information of the data repository 320 or otherwise accessible to the issuing processor aggregator 102). Credentials can vary according to an access. For example, a cardholder credential can be provided to cause a display of a card associated with the cardholder. A program credential can be provided to cause a display of card data 326 associated with any cards associated with a program.

Swipe data 324 can refer to or include information provided incident to an exchange (e.g., a transaction). For example, the swipe data 324 can include an account number, account holder, merchant identifier, merchant category code (MCC), exchange amount or authorization type (e.g., authorization, pre-authorization, adjustment, release, etc.). The swipe data can include an indication of card presence or absence (e.g., an online or in-person order). The swipe data 324 can include information received from a merchant or information received from another source. For example, the swipe data can include a first data structure originating at a merchant POS, based on an interaction with a mobile wallet, and second information from the mobile wallet (e.g., a location, authentication type, token, or so forth). The swipe data 324 can further include subsequent data structures related to an initial provision of card information. For example, further information can include a cancelation, a release of a hold, or an adjustment (e.g., indication of a tip, or an exchange which is for a different amount that an initial authorization, as in the case of a fuel purchase).

The swipe data 324 can include the data structure received from a device proximal to the exchange (e.g., the POS or mobile wallet) or other data structures or fields substituted for, modified by, or appended to such data structures, such as data fields provided by the acquiring provider, card other exchange network, issuing provider, or issuing processors. For example, various identifiers, risks, timestamps, etc. may be referred to as swipe data, when associated with a card swipe action.

Card data 326 (also referred to as card information, without limiting effect) may refer to or include information assisted with a card. For example, the card data 326 can include any information associated with a cardholder, which may be referred to as a card holder field (e.g., home address, billing address, unique identifier, personal identification number). The card data 326 may refer to or include information associated with an account. For example, the account can include account credentials, numbers, cycle information, ledgers (e.g., a balance of a stored value card, available credit of a credit card, a cash advance value, etc.). The account information can include limits associated with a daily spend, daily withdrawal, MCC spend, number of exchanges per time period, or the like.

In some embodiments, the card data 326 can be defined according to a card program. For example, all cards associated with a merchant, organization, bank, or other card program can include one or more data fields defined according to the program. For example, a card program for an association of homebuilders may be associated with no daily spend limit at a construction related MCC. Another card program for cardholders building credit may be associated with a daily spend limit. The association between a data field and a card program can be persistent or a default. For example, in some embodiments, the data field based on the program can be edited according to a request. For example, a cardholder of a card associated with a geographical restriction can request a temporary or permanent removal of the restriction incident to planned travel. The card data 326 may be stored in a nested data structure, such as nested account corresponding to one or more accounts of a user, each account corresponding to one or more exchanges. The data structure can be or be similar to a data structure of the electronic ledger 114 of the proprietary system 110. For example, the card data 326 or other data of the data repository 120 can be duplicative of data stored at the proprietary system, can be received therefrom, or can reside thereon.

Card data 326 can include card attributes, which can refer to attributes of a card associated with a nested data structure of an electronic ledger 114. A card attribute can include information received from or provided to the electronic ledger 114. For example, a card creation request can include card attributes such as a requested BIN range, cardholder name, cardholder address, card type, card status, credit limit, or cardholder agreement terms. Upon card creation, further card attributes may be associated with the card such as a card number, card verification code (CVC), expiration date, cardholder rewards, etc.

The card instantiator 302 can cause cards to be generated. The card instantiator can receive an indication of a cardholder for the card, such as a name, identifier, or linkage to a user included in an existing data structure. In some instances, (e.g., a new cardholder), the card instantiator 302 can receive card holder fields to generate a new entry for the cardholder. The cardholder fields can be compared to one or more existing cardholders. For example, the card instantiator 302 can determine a merger or two cardholders based on a same address, unique identifier (e.g., social security number, phone number, or email address). The card instantiator 302 can determine that card holder fields do not correspond to an existing cardholder, and generate a new entry for a cardholder based on the determination.

The card instantiator 302 can identify one or more data fields of a uniform interface 101 associated with a cardholder. The card instantiator 302 can provide one or more cardholder fields to the entity translator 310. For example, the card instantiator 302 can provide cardholder fields including a cellular telephone, work telephone, or home telephone field. The entity translator 310 can return a value of a primary phone and secondary phone, or daytime phone and evening phone. The card instantiator 302 can provide one or more data fields to a data enricher 330 of, or interfacing with the system of FIG. 1 (e.g., the data enrichment source 260 depicted in FIG. 2). For example, the card instantiator 302 can provide an address to the data enricher 330, and receive an enriched address. The enriched address can include further fields, such as to a ZIP+4 code generated from address, can include changes to an address, such as to correct "123 Main Av." to "123 MAIN AVE" according to a desired format. The enriched address can generate a street address based on other location information, such as a latitude and longitude, or otherwise enrich received information.

The enriched card holder fields can correspond to one or more interfaces, such as a uniform interface 101 or one or more issuing processor connections 113. For example, the phone fields, discussed above, can be received as cellular telephone, work telephone, home telephone and home telephone fields. The uniform interface 101 can include primary phone and secondary phone fields, and the issuing processor connection 113 can include a daytime phone and evening phone field. The IPIF 112 can map one or more fields between the respective interfaces. Such mapping can be dynamic or static. For example, the IPIF 112 can receive an indication of a time, compare the time to a predefined threshold, and determine, based on the time, whether the daytime phone should map to a primary or secondary number. Thusly, the card instantiator 302 can generate data fields corresponding to one or more interfaces. Thus, information received can be configured for provision the uniform interface 101 or the various issuing processor connections 113.

The card instantiator 302 can receive information associated with the card from the proprietary system 110, the information corresponding to the uniform interface, and provide the information to the issuing processor 104 in accordance with an issuing processor connection 113 (e.g., a card creation request). The card instantiator 302 can receive card information from the issuing provider responsive to the card creation request. The card instantiator 302 can provide further information to the proprietary system 110 responsive to the receipt of the card information. Example flows are provided hereinafter, at FIGS. 5 and 6.

The card instantiator 302 can receive a selection of a card program for one or more cards. For example, the selection of the card program can correspond to one or more predefined data fields associated with an account. The card instantiator 302 can include or interface with card data 326 associated with the program. For example, the card instantiator 302 can interface with card data 326 of the data repository 320, or with the program manager 304 to associate a card program with a card. In some instances, card data 326 can be specific to a card. That is, the card program can be a card-specific card program. References, herein, to program data can refer to either programs associated with one card, many cards, or zero cards (e.g., programs which are generated prior to a first card creation). In some embodiments, the card program can correlate to a particular issuing processor 104.

The program manager 304 can manage a card program associated with any number of cards or cardholders. For example, the program manager 304 can receive one more data fields associated with a card program. The program manager 304 can adjust one or more data fields associated with a program or with an account. For example, some data fields can retain a setting corresponding to a card program at a time of creation. For example, a card program can correspond to a bank identification number (BIN) range associated therewith, wherein a change to a BIN or a program may not change a BIN of issued cards. In some instances or implementations, a data field associated with a card field can change, such as to replace all or some existing accounts (e.g., a change to a geographic or MCC restriction can propagate to some legacy accounts which do not include the restriction, but may not propagate to other legacy accounts which include a geographic or MCC restriction exception).

In some instances or implementations, the program manager 304 can manage data fields associated with a physical card, or a depiction of a virtual card. The data fields, or other information or communications associated with the program can be referred to collectively, as a program entity. For example, a card program associated with an athletic franchise, retailer, or credit union can include an associated color, logo, or other card design. The program manager 304 can store a record of a card design corresponding to a program for one or more cards, and provide such a design to one or more user interfaces, such that a user of the user interface can verify a card identity. For example, a presentation of a physical depiction of a card can aid a cardholder in ensuring a selection of an intended card, relative to a presentation of a last 4 account digits, issuing provider, or other card data which may be less familiar to some users.

The exchange record generator 306 can generate an exchange record (e.g., a file, document, table, listing, message, notification, etc.) responsive to a swipe action. For example, upon a receipt of swipe data 324 or other exchange data (e.g., operation 215 of FIG. 2), the exchange record generator 306 can parse the exchange data for one or more predefined fields (e.g., an exchange amount, exchange time, or category code such as an MCC). The exchange record generator 306 can generate an exchange record based on the parsed data. The exchange record can include one or more fields corresponding to the uniform interface 101. For example, the exchange record can include an authorization or exchange amount configured for provision to the proprietary system 110.

The exchange record generator 306 can maintain exchange records based on a receipt of additional swipe data. For example, the exchange record generator 306 can append or substitute exchange record data fields, as in the case of an exchange processing subsequent to a hold, or an adjustment, credit, cancellation, or other action subsequent to a generation of an exchange record. The exchange record generator 306 can generate any portion of the exchange record for provision to another device over the uniform interface 101, or one of the issuing processor connections 113. For example, the exchange record generator 306 can interface with the entity translator 310 to generate multiple (e.g., duplicative) data fields corresponding to a same element parsed from the exchange data. Such duplicative data fields may reduce latency of communication with one or more interfaces. The exchange record generator 306 can interface with the entity translator 310 to generate translations incident to provision or receipt of various messages, which may reduce memory used by the exchange record generator 306, according to some embodiments.

The exchange record generator 306 can append or provide authorization information to an exchange record, such as to record an authorization approval, denial, reason code, or other information. The exchange record generator 306 can append or provide settlement information associated with clearing an exchange. For example, the exchange record generator 306 can interface with the exchange authorizer 308 to provide various exchange record authorization or settlement data.

The exchange record generator 306 can receive a dispute resolution entity such as one or more fields including information associated with a cardholder dispute of an exchange. Wherein some issuer entities of the various IPIF 112 include predefined fields associated with a dispute, the exchange record generator 306 can automatically adjust ledger information based on one or more fields of a dispute resolution entity. For example, a temporary adjustment to a balance, cancelation of a card, or other action can be performed. The exchange record generator 306 can append an exchange record information associated with a dispute, wherein the entity translator 310 can propagate data fields according to various formats, such as APIs, notifications, emails, data stored at a shared resource, etc. responsive to a receipt of the dispute resolution entity. For example, the propagation can be based on an identity of the issuing processor and the data field, as received across the uniform interface 101 from the proprietary system 110.

The exchange authorizer 308 can determine an authorization for an exchange. For example, the exchange authorizer 308 can interface with the proprietary system 110 (e.g., an electronic ledger 114 thereof, to determine an account balance) and an issuing processor 104 to authorize and clear an exchange. An example of exchange authorization is provided, hereinafter, with regard to FIG. 4 and FIG. 7.

The entity translator 310 can translate data fields associated with an issuer entity between a first instance configured for operation with the uniform interface 101 and one or more further instances configured for operation with respective issuing processor connections 113 of the system 100. For example, the various issuing processors 104 can include one or more different fields corresponding to a predefined translation.

Some translations can include predefined translations between differently formatted, organized, arranged, or other data fields. The data fields can be data fields of a data structure such as a relational database, or derived from computer-readable instructions (e.g., a constant, configuration setting, or relationship therebetween included in program code). Either of the data structure or instructions may be or a constituent to an issuer entity. The translation can concatenate, truncate, omit, or otherwise translate one or more data fields between interfaces. For example, an issuing processor connection 113 or uniform interface 101 can store a phone number according to a country code, or according to a phone type (e.g., cellular phone or home phone). Another interface can include flag bits for whether a phone can accept text messages, or whether a mobile wallet instance is hosted by the phone. The entity translator 310 can translate between the fields, which can include accessing further data sources (e.g., an indication of whether a particular phone hosts a mobile wallet can be stored at another location in a relational database, in another data structure, etc.).

The entity translator 310 can store one or more of the data fields according to a local data structure (e.g., a local cache), or convey any information between any connected interface. The entity translator 310 can further include or store outputs or inputs of the various translation operations. For example, one translation can include casting a string data type to an integer data type. Another translation can include comparing a first data field to a predefined value, and defining a second data field based on the value (e.g., the telephone number stored in a data field based on a bit flag value).

In some instances, translations may be dynamic, such as translations based on time of day, geographic location, or so forth. For example, a data field can correspond to a location of a user, a distance to a merchant, a geographic location or municipality such as a city, state, or country. A translation can depend upon available data and vary over time. For example, a card present bit can be determined according to swipe data 324 (e.g., a physical presence of a card), a coextensive location of a mobile device associated with a mobile wallet, and a merchant location associated with an exchange, or other data. A card present indication at one interface can include a bit flag indication, wherein a card present bit at another interface can include an indication of a source of the card present bit (e.g., may distinguish between a physical card presence such as an contactless "tap" card swipe, an insertion of a chip, a presence of a mobile wallet at a location associated with an exchange, or another verification method, such as a secondary online verification to establish a card present classification). The entity translator 310 can translate the card present indication according to a current or historical location of a user. For example, wherein a mobile device includes location data, or a cardholder provides swipe data 324 at a further merchant prior or subsequent to an exchange of interest, the entity translator 310 can determine a presence of a cardholder at the exchange of interest according to such location data (e.g., a card used at a merchant fifty miles from another exchange within five minutes, or from a mobile device of the user may not be indicative of a presence of the cardholder or card associated with the exchange of interest).

The entity translator 310 can interface with any number of data enrichment sources 260 to correct, modify, generate, or enhance data. A data enrichment source 260 can maintain merchant, cardholder, or other information. For example, the data enrichment source 260 can include a street address corresponding to a vendor location, or a vendor name (e.g., a vendor identifier of 987654—WMT S SLC UT 12345, can correspond to "Walmart store #12345, 123 Main Street, Salt Lake City Utah, 84415-1234). The entity translator 310 can identify information which does not correspond to a connected device or system (e.g., to one or more predefined formats for the uniform interface 101 or one or more of the issuing processor connections 113). For example, the entity translator 310 can determine a deviation between a data field and a data field associated with the uniform interface 101 or the connections 113. In response to the deviation, the entity translator 310 can provide the one or more data fields, information parsed therefrom, or another indication of data enrichment information (e.g., some data enrichment sources 260 can be configured to receive a numeric identifier for a unique merchant, such as 987654, some data enrichment sources 260 can be configured to receive a partial address, such as WMT S SLC UT, in combination with geographic data associated therewith, etc.). The entity translator 310 can receive a response from the data enrichment source 260 and update a data field with the enriched data. For example, the enriched data can correspond to a nested data structure of the electronic ledger 114 of the proprietary system.

The entity translator 310 can translate issuer entities according to a supported function of one or more issuing processors 104. For example, one issuing processor 104 can include a 7 day hold and a 30 day hold for exchange funds, wherein another issuing processor 104 may include only the 30 day hold. The entity translator 310 can issue a 30 day hold with the other issuing processor, and release the hold after 7 days to effect a 7 day hold. The entity translator 310 can provide, to the uniform interface 101, a same field associated with the explicit 7 day hold, or the 30 day hold which will be released after 7 days have elapsed. In another example, one issuing processor 104 can support incremental authorizations and another may not. The entity translator 310 can effect an incremental authorization by placing a hold, and thereafter releasing the hold and approving a separate exchange. For example, such information may be stored according to a nested data structure of the electronic ledger 114 of the proprietary system 110, such that the proprietary system 110 may interfere with the various issuing processors 104, as intermediated by the issuing processor aggregator 102, without generating separate fields for the various issuing processors 104.

Any of the translations of the entity translator 310 can be configured to translate between any of the issuing processor connections 113 and the uniform interface 101. Thus, the issuing processor aggregator 102 can present a single interface to any device connected thereto, along with the uniform interface 101 of the proprietary system 110. For example, any data enrichment sources 260 or other connections to the issuing processor aggregator 102 can be provided regardless of a selected or active IPIF 112, such that enrichment data may be available to more than one of the selected IPIF 112. For example, upon a change of a selection of an issuing processor 104, the connections to a data enrichment source 260 can be maintained, wherein any information can be translated, by the entity translator 310. The change of selection of the issuing processor 104 can be on an exchange basis, such as in response to receiving a card network 108 that is not supported by an issuing processor 104, or based on a replacement of one issuing processor 104 with another.

Figure 4:
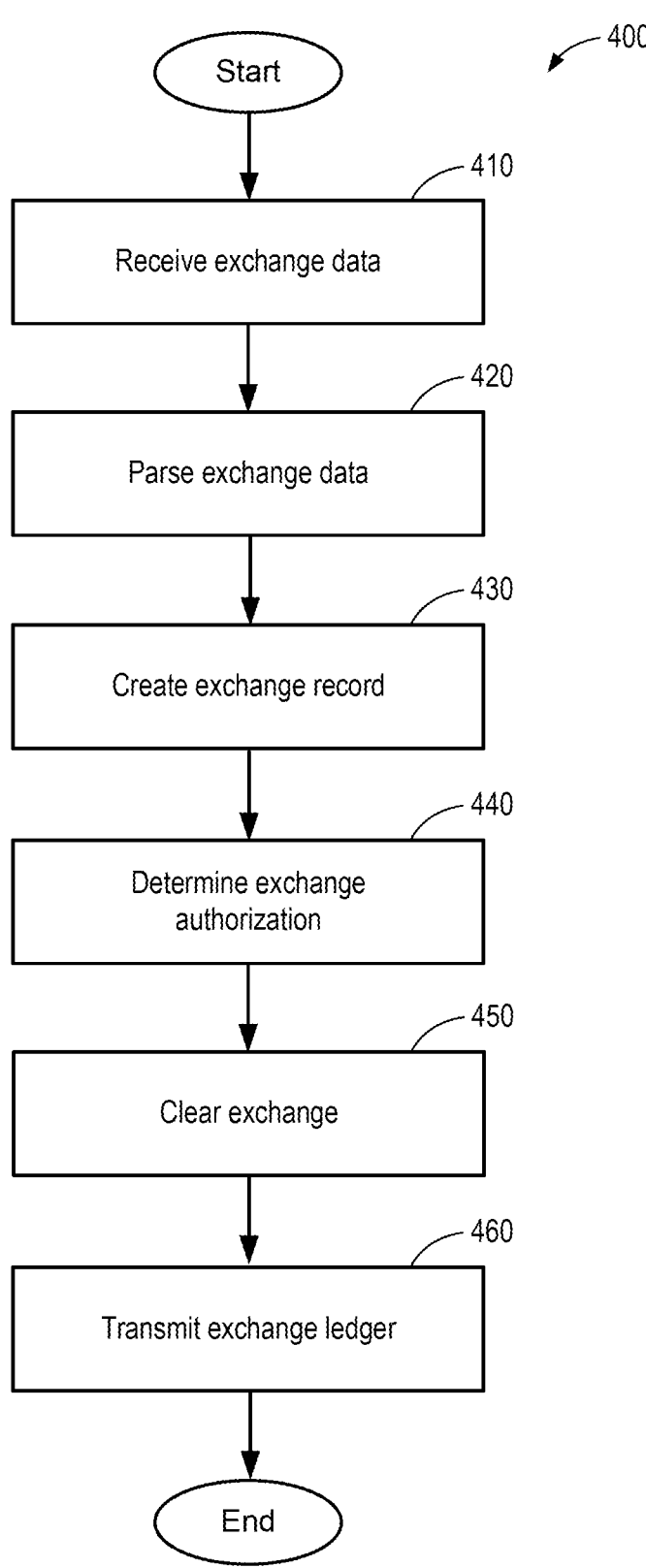
FIG. 4 is a flowchart of a method to manage exchanges, according to some implementations.

FIG. 4 is a flowchart of a method 400 to manage exchanges, according to some implementations. The method 400 can be performed by one or more processing circuits of one or more devices of FIG. 1. For example, the processing circuits can be or include processing circuits of the issuing processor aggregator 102. In broad overview of the method 400, at block 410, the one or more processing circuits can receive exchange data. At block 420, the one or more processing circuits can parse the exchange data. At block 430, the one or more processing circuits can create an exchange record. At block 440, the one or more processing circuits can determine an exchange authorization. At block 450, the one or more processing circuits can clear an exchange, based on the determination of the authorization. At block 460, the one or more processing circuits can transmit the exchange record for ledger recordation. Additional, fewer or different operations may be performed depending on the particular arrangement. In some embodiments, some, or all operations of the method 400 may be performed by one or more processors executing on one or more computing devices, systems or servers. In various embodiments, each operation may be re-ordered, added, removed or repeated.

Referring again to block 410, the one or more processing circuits can receive exchange data. The exchange data can include exchange data corresponding to an initial swipe action, or modifications, appendages, or other additions thereto. For example, the swipe data 324 can be provided by a physical or virtual card at a point of sale. The point of sale can include a POS terminal physically located at a merchant (e.g., as in the case of a tap to pay, physical swipe, chip insertion). The point of sale can include a virtual POS device (sometimes referred to as an eCommerce POS or Online POS). The swipe data can include an account number or other identifier (or portion thereof). For example, the swipe data can include a BIN which may be indicative of an issuing processor 104, a card program, or other aspects of card data 326.

The one or more processing circuits can receive exchange data for any number of exchanges. One or more received messages can correspond to each exchange, such as an initial swipe and any number of subsequent messages associated with the swipe (e.g., cancelations, adjustments, or the like). Each exchange can relate to a separate exchange associated with one or more merchants. The exchange data can include information from the merchant POS or from any other device in network communication therewith (e.g., operations 211, 212, 213, 214, or 215 of FIG. 2).

Referring again to block 420, the one or more processing circuits can parse, from the exchange data, a set of exchange data for each exchange. For example, the exchange data can include an amount of an exchange (e.g., a transaction amount, approval amount, hold amount, or other amount), an exchange time, a category code (e.g., MCC), or any other information associated with an exchange (e.g., a card present indicator, a transaction type, a geographic location, or so forth). The parsing can be according to a predefined format or data location in an issuer entity (e.g., of a comma separated list, a relational database, or another data structure). The parsing can be according to a content of the data. For example, the entity translator 310 can determine a predetermined data item corresponding to a data type (e.g., of a phone number account number, name, or so forth). Indeed, the entity translator 310 can parse any portion of the exchange data to translate information disposed therein according to the various translation operations as described with regard to, for example, FIG. 3. For example, the entity translator 310 can generate exchange data configured for interoperation with the uniform interface 101 or various further interfaces, such as any of the issuing processor connections 113.

Referring again to block 430, the one or more processing circuits can create an exchange record according to the exchange data. The exchange record can include the parsed information, along with any number of translations thereof. The exchange record can include one or more instances of the data record items. The instances can be configured to interface with one or more interfacing components, such as the proprietary system 110 (e.g., an electronic ledger 114 thereof) via the uniform interface 101 or any of the issuing processors 104 via a connection 113 thereto.

Referring again to block 440, the one or more processing circuits can determine authorization of the exchange. For example, the determination of the authorization can include determining the authorization according to at least an available balance of an account maintained in an electronic ledger 114. The authorization can be determined, by the exchange authorizer 308, for example, such as according to locally cached or stored instance of authorization data, or via messages conveyed, across the uniform interface 101, to the proprietary system (e.g., an available balance of an account maintained in the electronic ledger 114).

Referring again to block 450, the one or more processing circuits can clear an exchange record. The exchange record can be cleared responsive to an authorization output, such as an authorization approval or a message with another authorization response (e.g., for an incremental approval). The exchange record can be batched with zero or more additional exchange records to form an exchange record batch (e.g., zero or more approved exchanges). The issuing processor aggregator 102 can provide the batched exchange records according to a predefined time (e.g., hourly, daily, or so forth). The issuing processor aggregator 102 can pass the batched exchange records via an issuing processor connection 113 to an issuing processor 104 (including any adjustments between batches of the various interfaces, such as by generating null messages or casting periodic messages as notifications). The issuing processor 104 may, in turn, provide the batched exchange records to an issuing provider, card network 108, acquiring provider, or merchant.

Referring again to block 460, the one or more processing circuits can transmit the exchange record for ledger recordation. For example, the exchange records may be provided as uniform to the plurality of issuing processor integration interfaces. For example, the exchange record (or a batch thereof), can be configured for provision to any of the IPIF 112, or the uniform interface 101 for ledger recordation. The ledger can include an electronic ledger 114 of the proprietary system 110 or various further ledgers which may be maintained, provided, or interfaced with the various further system architecture 200 components depicted in FIG. 2 (e.g., a merchant, acquiring provider, card network 108, or issuing provider, or issuing processor ledger).

Figure 5:
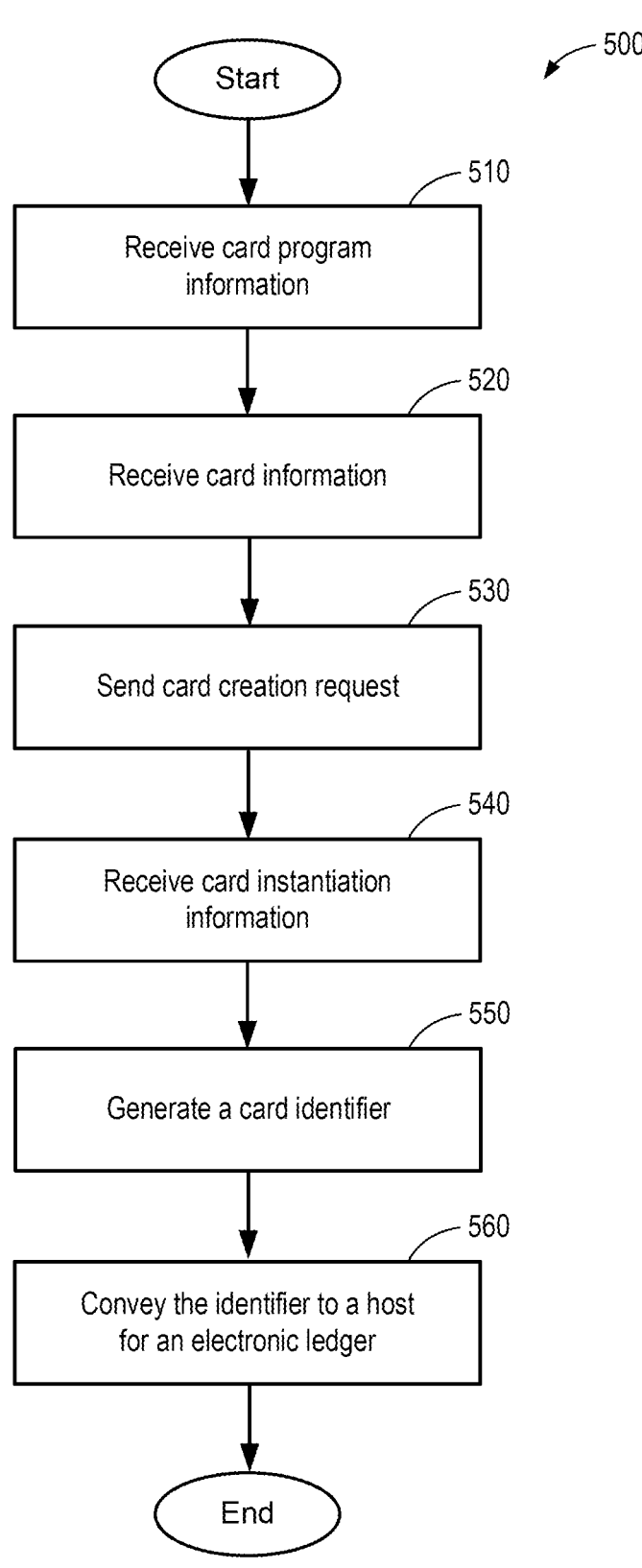
FIG. 5 is a flowchart of a method to generate a card, according to some implementations.

FIG. 5 is a flowchart of a method 500 to generate or instantiate a card, according to some implementations. The method 500 can be performed by one or more processing circuits of one or more devices of FIG. 1. For example, the processing circuits can be or include processing circuits of the issuing processor aggregator 102. Further, any computing device described herein can be configured to perform method 500. In general, in broad overview of method 500, at block 510, the one or more processing circuits can receive card program information. At block 520, the one or more processing circuits can receive card information. At block 530, the one or more processing circuits can send a card creation request. At block 540, the one or more processing circuits can receive card instantiation information. At block 550, the one or more processing circuits can generate a card identifier. At block 560, the one or more processing circuits can convey the identifier to a host for an electronic ledger 114. Additional, fewer or different operations may be performed depending on the particular arrangement. In some embodiments, some, or all operations of the method 500 may be performed by one or more processors executing on one or more computing devices, systems or servers. In various embodiments, each operation may be re-ordered, added, removed or repeated.

Referring again to block 510, the one or more processing circuits can receive card program information. The card program information can include one or more predefined card data 326 fields. For example, the program can include a daily spend limit, MCC restriction, card design (e.g., logo or color), or other information. The card program information can include an indication of a change to an account, such as a change to data associated with a pre-existing cardholder, a pre-existing account, or the like, which may vary from information for new cards. For example, card program information can include a selection of an arbitration provision for new cards which is different than for existing cardholders or existing cards (e.g., to maintain an opt-in or opt-out of a cardholder).

Referring again to block 520, the one or more processing circuits can receive card information (also referred to as card data 326) for a new card. The card information can be received across one or more interfaces. For example, the card information can be received from a proprietary system 110, across a uniform interface 101, or at an issuing processor aggregator 102. Wherein the issuing processor aggregator 102 includes various IPIFs 112, the card information may be received at one of the various IPIFs 112. The card information can include one or more cardholder fields, and a selection of a card program associated with one or more cards. For example, the selection can be received at a program manager 304, such that the program manager 304 can select further fields corresponding to the program, according to program information received at block 510. The card program can correspond to an issuing processor 104 operatively coupled to the issuing processor aggregator 102 (via an IPIF 112). For example, a BIN can correspond to a card program and an issuing processor 104.

Referring again to block 530, the one or more processing circuits can send a card creation request. For example, the card creation request can be configured to interface with an IPIF 112 corresponding to an issuing processor 104 or provider. The create card request can include card information such as card attributes.

Referring again to block 540, the one or more processing circuits can receive an indication of further card attributes.

For example, the further card attributes can include a status of the card (e.g., approved, issued, or activated). The status of the card may be further updated according to future issuer entity information, such as an indication of a blocked or canceled card subsequent to an issuance thereof. In some instances, a response can include an indication of a delay in issuance, such as a provision of a pending or review status.

Referring again to block 550, the one or more processing circuits can generate a unique identifier for the card. For example, the unique identifier can be based on an account or other number of the card, or an index value of a relational database or other data structure. For example, a unique identifier can be based on a cardholder in combination with a number of cards. For example, a second card of a cardholder can be provided as cardholder-2; a third card of a cardholder can be provided as cardholder-3, and so forth. In some instances, the unique identifier can be separate from an account number, such that communications referring to the account number may omit the account number, which may reduce transmission packet size, increasing throughput or maintain account security.

Referring again to block 560, the one or more processing circuits can convey the unique identifier to a host for an electronic ledger 114 associated with the card. For example, the issuing processor aggregator 102 can convey the unique identifier to the proprietary system for inclusion in the electronic ledger 114. As indicated above, at block 550, the unique identifier can be generated based on a nested data structure of the electronic ledger 114, such that the provision, across the uniform interface 101 can be according to the nested structure.

Figure 6:
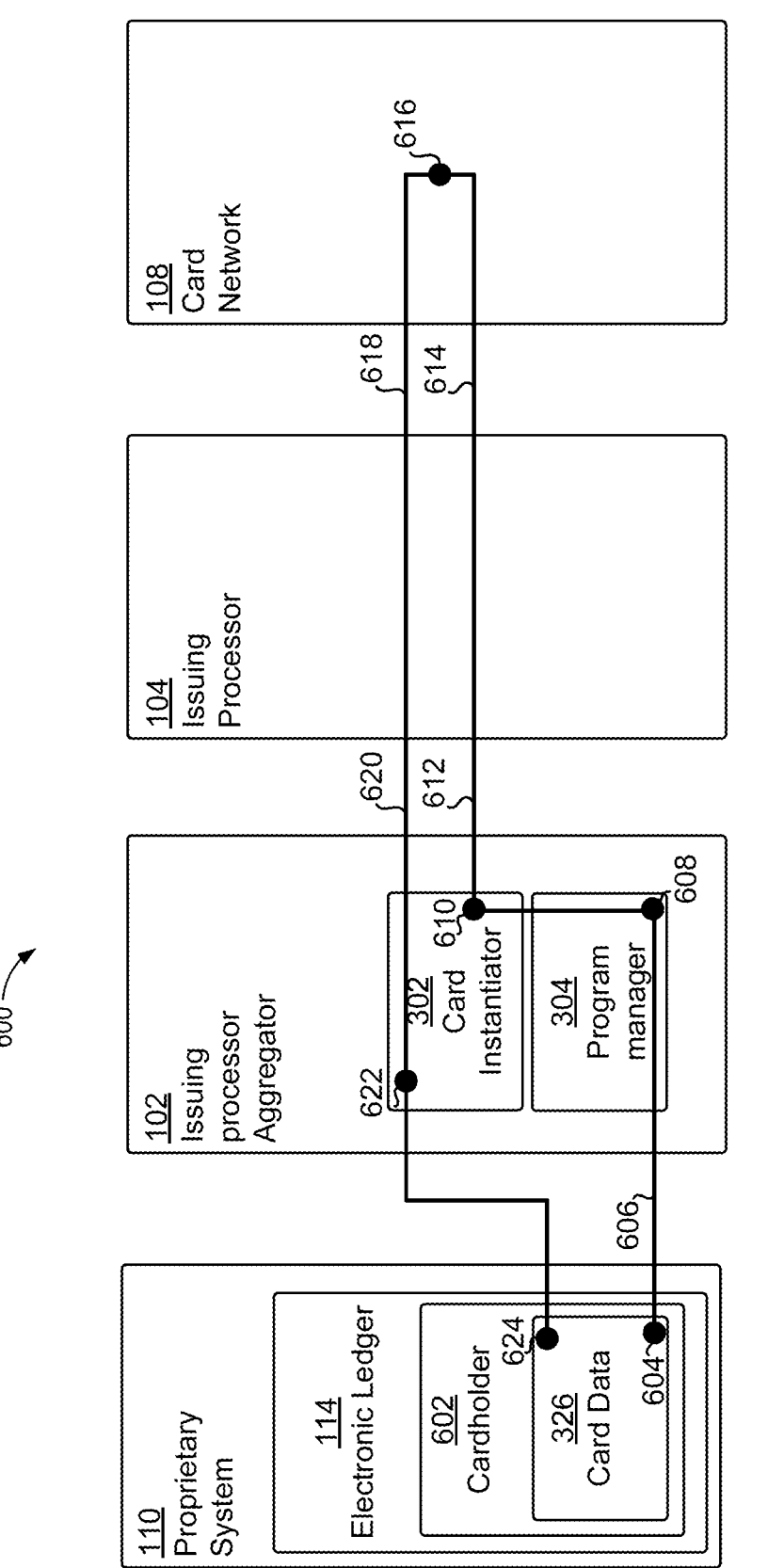
FIG. 6 is a flow diagram depicting card generation, according to some implementations.

FIG. 6 is a flow diagram 600 depicting card generation, according to some implementations. The flow diagram 600 can correspond to a flow of the method 500 of FIG. 5, wherein the one or more processing circuits are or include processing circuits of the issuing processor aggregator 102. For example, the issuing processor aggregator 102 can include an IPIF 112 connected to the issuing processor 104 via an issuing processor connection 113. The operations and messages described herein can be re-ordered, modified, adjusted, omitted, or further operations or messages can be included. Moreover, some messages or operations described herein in the singular can refer to multiple messages or operations, such as iterative or sequential operations or messages.

A proprietary system 110 can include an electronic ledger 114. The electronic ledger 114 can be a component of or include a nested data structure further including any number of cardholders and card data 326 for one or more cards of the cardholder 602. At operation 604, the proprietary system 110 can receive or gather card creation data. The proprietary system 110 can associate a portion of the electronic ledger 114 with the card creation data, such as a line of credit or stored value card program. The card program can include any number of predefined data fields. At operation 606, the card creation request is conveyed, over the uniform interface 101, to an issuing processor aggregator 102.

At operation 608, the card creation request is received by the program manager 304. The issuing processor aggregator 102 can save the card creation request in a card entity table. For example, the table can include a first portion of data corresponding to card creation data such as card attributes defined by the proprietary system 110 or the issuing processor aggregator 102.

At operation 610, the card instantiator 302 provides a card creation request according to a particular IPIF 112 associated with the issuing processor 104 for the card. For example, the card instantiator 302 can generate various messages (not depicted) for communication with the entity translator or the data enricher to generate data formatted for provision to the issuing processor 104. The card creation request is thereafter sent to the issuing processor 104 via message 612. Responsive to the receipt of message 612, the issuing processor can generate a further message 614 for provision to a card network 108. In various implementations, various further messages may be generated, such as messages for or corresponding to an issuer provider associated with the card. According to the depicted implementation, at operation 616, the card network 108 generates a card (e.g., a digital representation, instance, or other data structure corresponding to the card). The card generation can include various card data 326 such as card attributes to be conveyed to the proprietary system 110 or issuing processor 104 for storage. For example, the card network 108 can generate an account number, token, expiration data, card verification code or other card attribute for storage or conveyance.

The card network 108 can generate a message 618 for the issuing processor 104; the message 618 can cause the issuing processor 104 to generate a further message for the issuing processor aggregator 102. Messages 618 and 620 (like messages 612 and 614) can include different information. For example, the issuing processor aggregator 102, issuing processor 104, card or card network 108 can append additional fields to a message, remove data from a field, substitute information, or translate various data fields of a data entity. Thus, at operation 622, wherein the issuing processor aggregator 102 receives card data 326, the card instantiator 302 can update the card entity table of operation 610. That is, the card instantiator 302 can substitute preliminary fields, or changes (e.g., a change from an expected expiration date), or can complete omitted fields (e.g., an account number, CVC, or other card attributes). Any portions of such a card entity table, translations thereof, or the like can be conveyed to the proprietary system 110 for recordation in the electronic ledger 114 at operation 624. For example, the recordation can generate a link between the card entity table and the electronic ledger 114, such that exchange data associated with the card can be exchanged over a uniform interface 101 between the proprietary system 110 and the issuing processor aggregator 102 (e.g., as is described, henceforth, with regard to FIG. 7).

Figure 7:
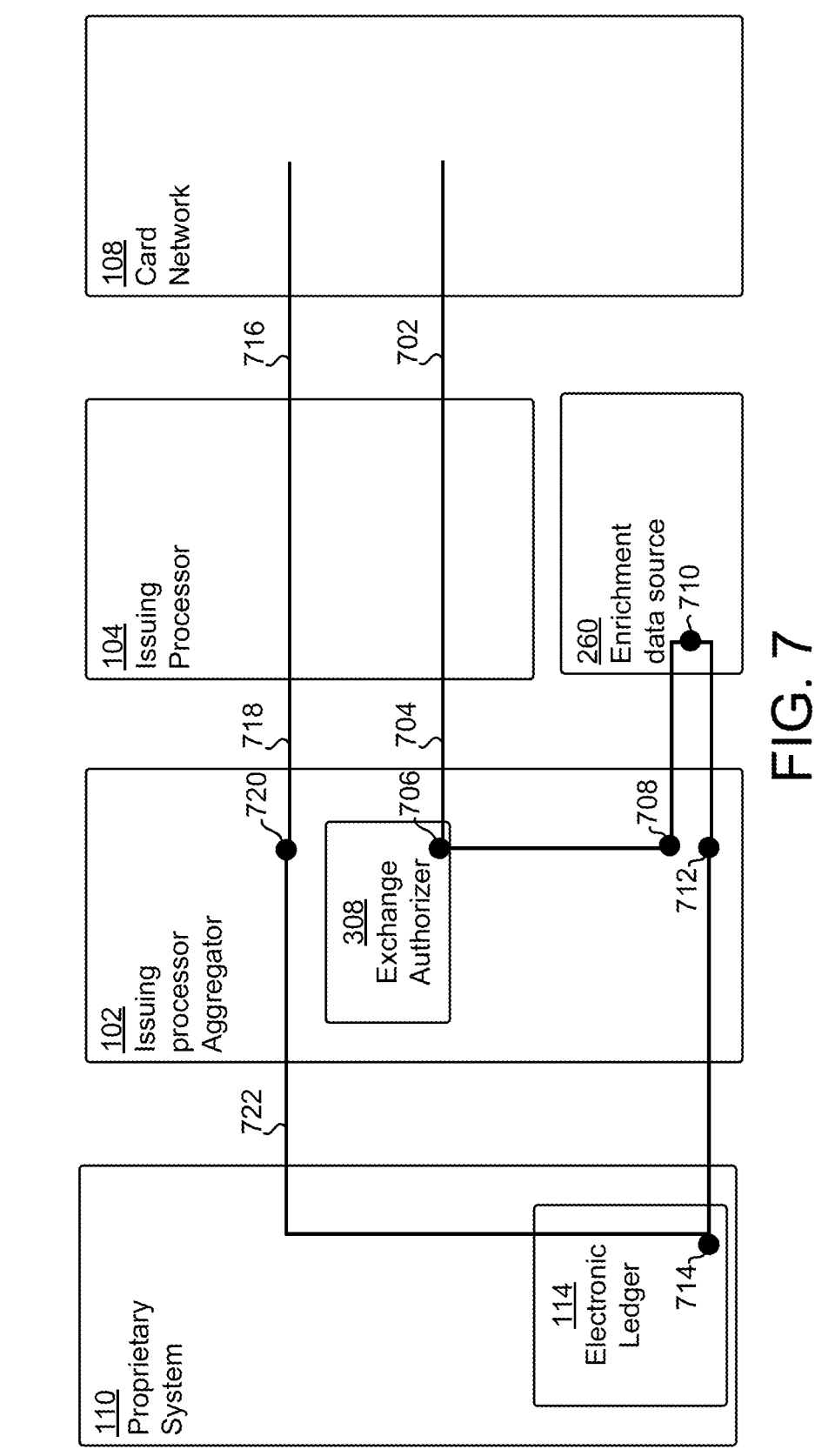
FIG. 7 is a flow diagram depicting exchange management, according to some implementations.

FIG. 7 is a flow diagram 700 depicting exchange management, according to some implementations. The flow diagram 700 can correspond to a flow of the method 400 of FIG. 4, wherein the one or more processing circuits are or include processing circuits of the issuing processor aggregator 102. For example, the issuing processor aggregator 102 can include an IPIF 112 connected to the issuing processor 104 via an issuing processor connection 113. The operations and messages described herein can be re-ordered, modified, adjusted, omitted, or further operations or messages can be included. Moreover, some messages or operations described herein in the singular can refer to multiple messages or operations, such as iterative or sequential operations or messages.

At operation 702, the card network 108 provides an indication of a swipe action to the issuing processor 104. For example, the card network 108 can receive swipe data 324 corresponding to the swipe action from a merchant, via one or more intermediaries, such as an acquiring provider. Responsive to the receipt of the message from the card network 108, the issuing processor 104 can provide a message 704 to the issuing processor aggregator 102. At operation 706, the exchange authorizer 308 can approve or deny the corresponding exchange based on one or more exchange (e.g., transaction) rules (e.g., a comparison of an exchange amount to a stored value or an available credit associated with a card). The authorization may not be an only or final approval. For example, the issuing processor 104 can generate a first determination of authorization (e.g., an authorization, non-authorization, pre-authorization, or other operation). Further, the exchange authorizer 308 can approve or deny the exchange based on one or more messages (not depicted) with the proprietary system 110. For example, the comparison to a balance can be based on a balance maintained in the electronic ledger 114, or otherwise maintained by the proprietary system 110.

At operation 708, the issuing processor aggregator 102 can generate an exchange record associated with the exchange. For example, the exchange record can include an indication of authorization, non-authorization, or a further reason code associated with the authorization. In some instances, the exchange record can be used to generate enriched exchange record data (e.g., based on a predetermined lookup function or another determination of a deviation between a data field of the exchange record and a uniform field corresponding thereto). At operation 710, a data enrichment source 260 can provide the enriched exchange data based on the receipt of a message from the issuing processor aggregator 102 (e.g., an entity translator 310 thereof). The enrichment data source 260 can provide the enriched data to the issuing processor 104, whereupon the exchange record can be updated to include the enriched data, at operation 712. At operation 714, the proprietary system receives an indication of the exchange record, which may be used to update an electronic ledger 114 (e.g., to reduce an available balance by an amount corresponding to a hold, pending charge, settled charge, or so forth).

The card network 108 can provide a message 716 including an indication of a further swipe action to the issuing processor 104. For example, the further swipe action can be swipe data 324 indicative of an adjustment to a prior authorization or pre-authorization (e.g., adding a tip to a restaurant check), reversing a transaction, or another adjustment to a transaction or other exchange. The issuing processer 104 can, responsive to receipt of the message 716, generate a further message 718 for provision to the issuing processor aggregator 102. At operation 720, upon a receipt of the message 718 by the issuing processer aggregator 102, the issuing processor aggregator 102 can associated the further swipe action associated with the indication of the swipe action received at operation 706. The issuing processor aggregator 102 can update various data structures (e.g., exchange records), and provide a message 722 indicating such an update to the proprietary system 110, which can update an electronic ledger 114 based thereupon. For example, the update of the electronic ledger 114 can include increasing an available balance responsive to an exchange cancellation or reversal, reducing another balance in response to an approval or settlement of an exchange, etc.

Figure 8:
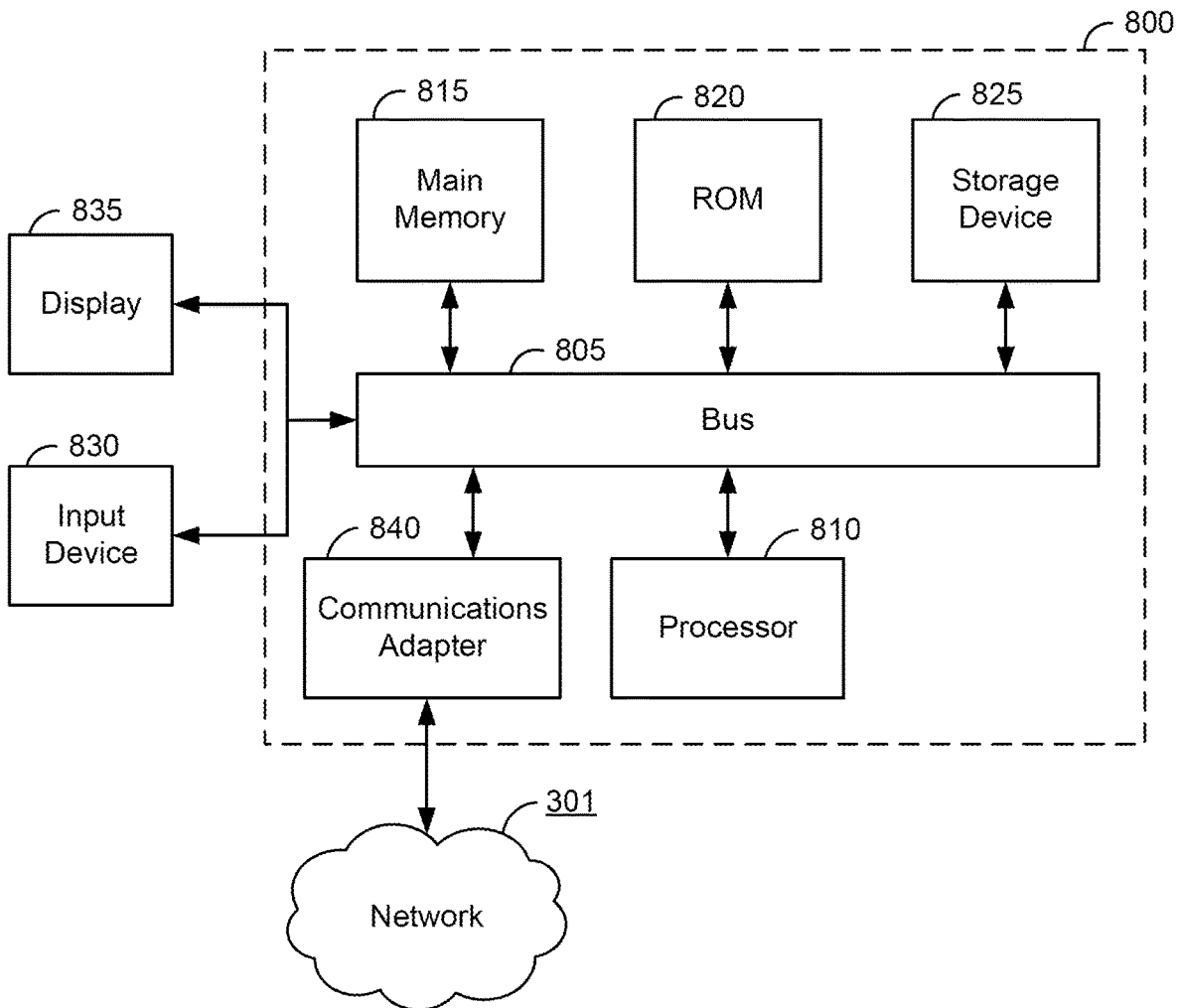
FIG. 8 is a block diagram illustrating an example computing system suitable for use in the various implementations described herein.

Referring now to FIG. 8, a depiction of a computer system 800 is shown. The computer system 800 can be used, for example, to implement an issuing processor aggregator 102, proprietary system 110, issuing processors 104, card networks 108, and/or various other example systems described in the present disclosure. The computing system 800 includes a bus 805 or other communication component for communicating information and a processor 810 coupled to the bus 805 for processing information. The computing system 800 also includes main memory 815, such as a random-access memory (RAM) or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid-state device, magnetic disk, or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information, and command selections to the processor 810. In another implementation, the input device 830 has a touch screen display 835. The input device 830 can include any type of biometric sensor, a cursor control, such as a mouse, a trackball, or cursor direction keys, for communicating direction information and command selections to the processor 810 and for controlling cursor movement on the display 835.

In some implementations, the computing system 800 may include a communications adapter 840, such as a networking adapter. In various illustrative implementations, any type of networking configuration may be achieved using communications adapter 840, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 800 in response to the processor 810 executing an implementation of instructions contained in main memory 815. Such instructions can be read into main memory 815 from another computer-readable medium, such as the storage device 825. Execution of the implementation of instructions contained in main memory 815 causes the computing system 800 to perform the illustrative processes described herein. One or more processors in a multi-processing implementation may also be operated to execute the instructions contained in main memory 815. In alternative implementations, hard-wired circuitry may be used in place of or in combination with software instructions to implement illustrative implementations. Thus, implementations are not limited to any specific combination of hardware circuitry and software.

That is, although an example processing system has been described in FIG. 8, implementations of the subject matter and the functional operations described in this specification can be carried out using other types of digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the implementations of FIG. 8 as singular, stand-alone devices, one of ordinary skill in the art will appreciate that, in some implementations, the computing system 800 may include virtualized systems and/or system resources. For example, in some implementations, the computing system 800 may be a virtual switch, virtual router, virtual host, or virtual server. In various implementations, computing system 800 may share physical storage, hardware, and other resources with other virtual machines. In some implementations, virtual resources of the network (e.g., network 301 of FIG. 3) may include cloud computing resources such that a virtual resource may rely on distributed processing across more than one physical processor, distributed memory, etc.

Some example implementations, according to the present disclosure, are now described.

Some implementations relate to a system to aggregate issuing processor systems. The system can include a plurality of issuing processor integration interfaces. Each of the issuing processor integration interfaces can be specific to a corresponding issuing processor system of a plurality of issuing processor systems. Each issuing processor integration interface can include one or more issuer entities for card data, the card data for card creation and management within the corresponding issuing processor system. The issuer entities can be for customer data specific to the corresponding issuing processor system, and for credentials for an issuer account. The system can include one or more card records. Each card record can correspond to resources for instantiating a card, modifying functionality of the card, and managing the card. The card can be operable with a card network through an issuing processor system of the plurality of issuing processor systems. The system provides uniform receiving of data from and transmitting of data to the plurality of issuing processor systems.

In some implementations, each of the issuing processor integration interfaces is configured to receive data from and transmit data to a different respective issuing processor system in a format and comprising data specific to the respective issuing processor system. The uniform data can be received via a JSON data object of an application programming interface.

In some implementations, the one or more issuer entities include one or more issuer card data fields for card data for card creation and management within the corresponding issuing processor system. The one or more issuer entities can further include one or more issuer customer data fields for housing customer data specific to the corresponding issuing processor system. The one or more issuer entities can further include one or more issuer account data fields for housing the credentials for the issuer account.

In some implementations, the uniform receiving of data from and transmitting of data includes receiving data in a first format from a first issuing processor system of the plurality of issuing processor systems and data in a second format from a second issuing processor system of the plurality of issuing processor systems. The uniform receiving of data from and transmitting of data can further include converting the data in the first format from the first issuing processor system to a third format and the data in the second format from the second issuing processor system to the third format. The uniform receiving of data from and transmitting of data can further include transmitting, through a uniform interface, the converted data in the third format from the first issuing processor system and the second issuing processor system to a nested data structure of an electronic ledger.

In some implementations, the system can receive a first data field of an issuer entity. The system can determine a deviation between the first data field and a uniform data field of the uniform interface. Responsive to determining the deviation, the system can convey an indication to a data enricher, the indication comprising the first data field and an indication of a source of the data field, the source indicative of a location of enriched data. The system can update, responsive to a receipt of the enriched data from the data enricher, the uniform data field with the enriched data to correspond to the nested data structure.

In some implementations, the issuer entities comprise a program entity comprising one or more data fields associated with a card program. The credentials can correspond to the program entity, a user interface being configured to present, based on the receipt of the credentials. The presentation can include the one or more data fields. The presentation can include a balance of the electronic ledger associated with one or more cards associated with the card program. One or more card programs can be associated with one or more of the issuing processor systems, with the credentials corresponding to a subset of the one or more card programs.

In some implementations, the issuer entities comprise dispute resolution entities corresponding to each of the issuing processor systems. The system can generate a data field of for a dispute resolution entity. The system can provide the data field to an issuing processor according to a connection and content of the data field, based on a receipt of a uniform input and an identity of the issuing processor system.

In some implementations, a card management or creation operation, for a first subset of the issuing processor systems, uses one of the one or more issuer entities. Further according to some such implementations, no card management or creation operation, for a second subset of the issuing processor systems, uses the one of the one or more issuer entities. The system can be configured to perform two or more operations with the second subset corresponding to the card management or creation operation of the first subset. The system can be configured to uniformly receive an indication to perform the card management or creation operation between the first subset and the second subset.

In some implementations, the system includes one or more program data fields for a card program, the program data fields specifying attributes for cards issued according to the card program and a correlation to an issuing processor integration interface of the plurality of issuing processor integration interfaces.

Some implementations relate to a method to aggregate issuing processor systems. The method can be performed by one or more processors. The method can include receiving first data associated with a plurality of issuing processor integration interfaces, each specific to a corresponding issuing processor system of a plurality of issuing processor systems, each issuing processor integration interface comprising one or more issuer entities for card data for card creation and management within the corresponding issuing processor system, for customer data specific to the corresponding issuing processor system, and for credentials for an issuer account. The method can include maintaining one or more card records, each corresponding to resources for instantiating a card, modifying functionality of the card, and managing the card, wherein the card is operable with a card network through an issuing processor system of the plurality of issuing processor systems. The method can include generating, by the one or more processors, a uniform data structure for a plurality of issuer entity mappings, the plurality of issuer entity mappings corresponding to the issuing processor systems.

In some implementations, the one or more of the issuer entity mappings include a first mapping between a first data field of a first of the issuer entities and a first data field of a second of the issuer entities, the translation based on a predefined relationship between the first fields. The mappings can include a second mapping between a second data field and a third data field of the first of the issuer entities and a second data field of the second of the issuer entities. The mappings can include a third mapping between a fourth data field of the first of the issuer entities, a data enrichment source, and a fourth data field of the second of the issuer entities.

In some implementations, the method includes transmitting, by the one or more processors, based on the uniform data structure, card creation or management data to one of the issuing processor systems.

In some implementations, the method includes receiving data from a corresponding issuing processor system in a format and comprising data specific to the respective issuing processor system, the format comprising a JSON data object received over an application programming interface (API). The method can include transmitting data to the corresponding issuing processor system in the format over the API.

In some implementations, the one or more issuer entities include one or more issuer card data fields for card data for card creation and management within the corresponding issuing processor system. The issuer entities can include one or more issuer customer data fields for housing customer data specific to the corresponding issuing processor system. The issuer entities can include one or more issuer account data fields for housing the credentials for the issuer account.

In some implementations, the method includes receiving data in a first format from a first issuing processor system of the plurality of issuing processor systems and data in a second format from a second issuing processor system of the plurality of issuing processor systems. The method can include converting the data in the first format from the first issuing processor system to a third format and the data in the second format from the second issuing processor system to the third format. The method can include transmitting through a uniform interface, the converted data in the third format from the first issuing processor system and the second issuing processor system to a nested data structure of an electronic ledger.

In some implementations, the method includes receiving a first data field of an issuer entity. The method can include determining a deviation between the first data field and a uniform data field of the uniform interface. The method can include conveying an indication to a data enricher, the indication comprising the first data field and an indication of a source of the data field, the source indicative of a location of enriched data, the conveyance responsive to determining the deviation. The method can include updating responsive to a receipt of the enriched data from the data enricher, the uniform data field with the enriched data to correspond to the nested data structure.

In some implementations, the issuer entities include a program entity comprising one or more data fields associated with a card program. The method can include presenting via a user interface based on a receipt of the credentials, the one or more data fields and a balance of the electronic ledger associated with one or more cards associated with the card program. The credentials can correspond to the program entity, one or more card programs are associated with one or more of the issuing processor systems, the credentials corresponding to a subset of the one or more card programs. One or more card programs can be associated with one or more of the issuing processor systems, the credentials corresponding to a subset of the one or more card programs.

Some implementations relate to a system. The system includes an issuing processor integration interface configured to connect to a corresponding issuing processor system. The issuing processor integration interface includes a plurality of issuer entities. The issuer entities include a first issuer entity comprising first card data for card creation. The issuer entities include a second issuer entity comprising second card data for card management. The issuer entities include a third issuer entity comprising customer data specific to the corresponding issuing processor system. The issuer entities include a fourth issuer entity for credentials for an issuer account. One or more card records for a card can be operable with a card network through an issuing processor system. The card records can include first resources for instantiating a card, second resources modifying functionality of the card, and third resources for managing the card. The system provides uniform receiving of data from and transmitting of data to the issuing processor system and a plurality of further issuing processor systems.

In some implementations, the issuing processor integration interface and a multiple further issuing processor integration interfaces are configured to receive data from and transmit data to respective issuing processor systems in a format and including data specific to the respective issuing processor systems. The uniform receiving of data can be received via a JSON data object of an application programming interface.

In some implementations, the plurality of issuer entities include one or more issuer card data fields for card data for card creation and management within the corresponding issuing processor system. The plurality of issuer entities include one or more issuer customer data fields for housing customer data specific to the corresponding issuing processor system. The plurality of issuer entities include one or more issuer account data fields for housing the credentials for the issuer account.

Some implementations relate to a computer-implemented method to process exchanges. The method can be performed by one or more processors. The method can include receiving, at a plurality of issuing processor integration interfaces, exchange data for a plurality of exchanges each initiated at a point of sale by a card associated with a card network, each issuing processor integration interface of the plurality of issuing processor integration interfaces specific to a corresponding issuing processor system of a plurality of issuing processor systems, wherein each exchange of the plurality of exchanges is received at a destination for an issuing processor integration interface corresponding to a handling issuing processor system handling the exchange. For each exchange of the plurality of exchanges, the method can include parsing from the exchange data a set of exchange data for the exchange, including an exchange amount, an exchange time, and a category code. The method can include creating an exchange record according to the exchange data. For each exchange of the plurality of exchanges, the method can include determining authorization of the exchange according to at least an available balance of an account maintained in an electronic ledger. For each exchange of the plurality of exchanges, the method can include, if the exchange is authorized, clearing the exchange. For each exchange of the plurality of exchanges, the method can include transmitting the exchange record for ledger recordation, the exchange record uniform to the plurality of issuing processor integration interfaces.

In some implementations, the destination is a shared resource between one of the issuing processor integration interfaces and the corresponding issuing processor system. The computer-implemented method can further include receiving, by the one or more processors, an indication of an exchange. The computer-implemented method can further include retrieving, by the one or more processors, the exchange data. The computer-implemented method can further include associating, by the one or more processors, the retrieved exchange data with the indication of the exchange.

In some implementations, determining authorization of the exchange includes generating a uniform authorization request. Determining authorization of the exchange can further include conveying the uniform authorization request to a host for the electronic ledger. Determining authorization of the exchange can further include receiving, by the one or more processors, an indication of approval based on a ledger balance.

In some implementations, the computer-implemented method further includes identifying a portion of the exchange data lacking relevant information. The computer-implemented method can further include conveying the portion of the exchange data to an enrichment resource, computer-implemented method can further include providing enriched data corresponding to the portion of the exchange data to a host of the electronic ledger.

In some implementations, the computer-implemented method further includes clearing the exchange within a predefined time elapsed from a generation of the received exchange data.

Some implementations relate to a system to process exchanges. The system can include a plurality of issuing processor integration interfaces specific to a corresponding issuing processor system of a plurality of issuing processor systems, wherein each exchange of a plurality of exchanges is received at a destination for an issuing processor integration interface corresponding to a handling issuing processor system handling the exchange. The system can include one or more processors to receive, at the plurality of issuing processor integration interfaces, exchange data for the plurality of exchanges each initiated at a point of sale by a card associated with a card network. The system can include one or more processors to parse from the exchange data, an exchange amount, an exchange time, and a category code. The system can include one or more processors to create an exchange record according to the exchange data. The system can include one or more processors to determine authorization of the exchange according to at least an available balance of an account maintained in an electronic ledger. The system can include one or more processors to clear the exchange if the exchange is authorized. The system can include one or more processors to transmit the exchange record for ledger recordation, the exchange record uniform to the plurality of issuing processor integration interfaces.

Some implementations relate to a computer-implemented method to instantiate a card program. The computer-implemented method can be implemented by one or more processors. The computer-implemented method can include receiving, at a plurality of issuing processor integration interfaces, card information for a new card, the card information including card holder fields and a selection of a card program. The card program can correlate to an issuing processor system of a plurality of issuing processor systems. Each issuing processor integration interface of the plurality of issuing processor integration interfaces can be specific to a corresponding issuing processor system of the plurality of issuing processor systems. Each exchange of the plurality of exchanges can be received at a destination for an issuing processor integration interface corresponding to a handling issuing processor system handling the exchange. The computer-implemented method can include sending, by the issuing processor integration interface corresponding to the issuing processor system, a create card request to the issuing processor system, the create card request including card attributes. The computer-implemented method can include receiving, by the one or more processors for the issuing processor integration interface corresponding to the issuing processor system, an indication of a status of the card. The computer-implemented method can include generating, by the one or more processors, responsive to the status of the card, a unique identifier for the card. The computer-implemented method can include conveying the unique identifier to a host for an electronic ledger associated with the card.

Some implementations relate to a system to instantiate a card. The system can include a plurality of issuing processor integration interfaces each specific to a corresponding issuing processor system of a plurality of issuing processor systems, wherein each issuing processor integration interface comprises one or more issuer entities for card data for card creation and management within the corresponding issuing processor system, for customer data specific to the corresponding issuing processor system, and for credentials for an issuer account. One or more card entities can include resources for instantiating a card, modifying functionality of the card, and managing the card. The card can be operable with a card network through an issuing processor system of the plurality of issuing processors systems. The one or more processors can receive, via the communication network interface, card information for a new card, the card information including card holder fields and a selection of a card program, wherein the card program correlates to the issuing processor system of the plurality of issuing processor systems. The one or more processors can send, by the issuing processor integration interface corresponding to the issuing processor system, a create card request to the issuing processor system, the create card request including card attributes. The one or more processors can receive, by the issuing processor integration interface corresponding to the issuing processor system, an indication of a status of the card. The one or more processors can generate, responsive to the status of the card, a unique identifier for the card. The one or more processors can convey the unique identifier to a host for an electronic ledger associated with the card.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented and/or arranged in combination in a single implementation. Conversely, various features that are described in the context of a single implementation can also be implemented and arranged in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative implementations described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations, implementations, illustrative embodiments, and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, arrangements, elements, or acts of the systems and methods herein referred to in the singular may also embrace implementations including a plurality of these elements, and any references in plural to any implementation, arrangement, element, or act herein may also embrace implementations including only a single element. References in the singular or plural form are not intended to limit the presently disclosed systems or methods, or their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components, including, but not limited to, processing circuitry, network interfaces, peripheral devices, input devices, output devices, and sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical (e.g., magnetic), or fluidic.

What is claimed is:

1. A system to aggregate issuing processor systems, the system comprising:
   one or more computing devices comprising:
      one or more processors;
      memory;
      a plurality of issuing processor integration application programming interfaces (APIs) each configured to communicate with a corresponding computing system of an issuing processor system of a plurality of issuing processor systems, wherein each issuing processor integration API comprises one or more data structures configured to store values configured to be used for card creation and management within the corresponding computing system, for customer data specific to the corresponding computing system, and for credentials for an issuer account; and one or more card records in a database in the memory, each corresponding to resources configured to instantiate a card, modify functionality of the card, and manage the card, wherein the card is operable with a card network through an issuing processor system of the plurality of issuing processor systems, wherein the one or more processors are configured by machine-readable instructions in the memory to provide uniform receiving of data from and transmitting of data to and from the plurality of issuing processor systems by:

receiving data in a first format from a first computing system of a first issuing processor system of the plurality of issuing processor systems over a first issuing processor integration API for the first computing system and data in a second format from a second computing system of a second issuing processor system of the plurality of issuing processor systems over a second issuing processor integration API for the second computing system;

converting the data in the first format from the first computing system of the first issuing processor system to a third format and the data in the second format from the second computing system of the second issuing processor system to the third format; and transmitting, through a uniform API, the converted data in the third format from the first computing system of the first issuing processor system and the computing system of the second issuing processor system to a nested data structure of an electronic ledger.

2. The system of claim 1, wherein:

each of the issuing processor integration APIs is configured to receive data from and transmit data to a different respective issuing processor system in a format and comprising data specific to the respective issuing processor system; and the uniform receiving of data is received via a JSON data object of an application programming interface.

3. The system of claim 1, wherein the one or more data structures comprise:

one or more issuer card data fields for card data for card creation and management within the corresponding issuing processor system;

one or more issuer customer data fields for housing customer data specific to the corresponding issuing processor system; and one or more issuer account data fields for housing the credentials for the issuer account.

4. The system of claim 1, wherein the system is configured to:

receive a first data field of an issuer data structure;

determine a deviation between the first data field and a uniform data field of the uniform interface;

responsive to determining the deviation, convey an indication to a data enricher, the indication comprising the first data field and an indication of a source of the data field, the source indicative of a location of enriched data; and update, responsive to a receipt of the enriched data from the data enricher, the uniform data field with the enriched data to correspond to the nested data structure.

5. The system of claim 1, wherein:

the issuer data structures comprise a program entity comprising one or more data fields associated with a card program;

the credentials correspond to the program entity, a user interface being configured to present, based on the receipt of the credentials:

the one or more data fields; and a balance of the electronic ledger associated with one or more cards associated with the card program; and one or more card programs are associated with one or more of the issuing processor systems, the credentials corresponding to a subset of the one or more card programs.

6. The system of claim 1, wherein:

the issuer data structures comprise dispute resolution entities corresponding to each of the issuing processor systems, the one or more computing devices configured to:

generate a data field for a dispute resolution entity; and provide the data field to a computing system of an issuing processor system according to a connection and content of the data field, based on a receipt of a uniform input and an identity of the issuing processor system.

7. The system of claim 1, wherein:

a card management or creation operation, for a first subset of the issuing processor systems, uses one of the one or more issuer data structures; and no card management or creation operation, for a second subset of the issuing processor systems, uses the one of the one or more issuer data structures, wherein the one or more computing devices are configured to perform two or more operations with the second subset corresponding to the card management or creation operation of the first subset, the configured to uniformly receive an indication to perform the card management or creation operation between the first subset and the second subset.

8. The system of claim 1, comprising:

one or more program data fields for a card program, the program data fields specifying attributes for cards issued according to the card program and a correlation to an issuing processor integration API of the plurality of issuing processor integration APIs.

9. A computer-implemented method to aggregate issuing processor systems, comprising:

receiving, by one or more processors, first data associated with a plurality of issuing processor integration application programming interfaces (APIs), each configured to communicate with a corresponding computing system of an issuing processor system of a plurality of issuing processor systems, each issuing processor integration API comprising one or more data fields, the issuing processor system using the one or more issuer data structures to store card data and create and manage cards within the corresponding computing system of the issuing processor system, for customer data specific to the corresponding issuing processor system, and for credentials for an issuer account;

maintaining, by the one or more processors, one or more card records, each corresponding to resources;

instantiating, by the one or more processors, a card, modifying, by the one or more processors, functionality of the card, and managing, by the one or more processors, the card, wherein the card is operable with a card network through an issuing processor system of the plurality of issuing processor systems;

generating, by the one or more processors, a uniform data structure for a plurality of issuer data structure mappings, the plurality of issuer data structure mappings corresponding to the issuing processor systems; and using, by the one or more processors, the uniform data structure for communication between the computing systems of the plurality of issuing processor system and an electronic ledger, by:

receiving, by the one or more processors, data in a first format from a first computing system of a first issuing processor system of the plurality of issuing processor systems over a first issuing processor integration API for the first computing system and data in a second format from a second computing system of a second issuing processor system of the plurality of issuing processor systems over a second issuing processor integration API for the second computing system;

converting, by the one or more processors, the data in the first format from the first computing system of the first issuing processor system to a third format having the uniform data structure and the data in the second format from the second computing system of the second issuing processor system to the third format; and transmitting, by the one or more processors through a uniform API using the uniform data structure, the converted data in the third format from the first computing system of the first issuing processor system and the computing system of the second issuing processor system to a nested data structure of the electronic ledger.

10. The computer-implemented method of claim 9, comprising one or more of the issuer data structure mappings to include:

a first mapping between a first data field of a first of the issuer data structures and a first data field of a second of the issuer data structures, the mapping based on a predefined relationship between the first fields;

a second mapping between a second data field and a third data field of the first of the issuer data structures and a second data field of the second of the issuer data structures; and a third mapping between a fourth data field of the first of the issuer data structures, a data enrichment source, and a fourth data field of the second of the issuer data structures.

11. The computer-implemented method of claim 9, comprising:

transmitting, by the one or more processors, based on the uniform data structure, card creation or management data to one of the issuing processor systems.

12. The computer-implemented method of claim 9, comprising:

receiving, by the one or more processors, data from a computing system of a corresponding issuing processor system in a format and comprising data specific to the computing system of the corresponding issuing processor system, the format comprising a JSON data object received over an API;

transmitting, by the one or more processors, data to the corresponding issuing processor system in the format over the API.

13. The computer-implemented method of claim 9, wherein the one or more issuer data structures comprise:

one or more issuer card data fields for card data for card creation and management within the corresponding computing system of the issuing processor system;

one or more issuer customer data fields for housing customer data specific to the corresponding computing system of the issuing processor system; and one or more issuer account data fields for housing the credentials for the issuer account.

14. The computer-implemented method of claim 9, comprising:

receiving, by the one or more processors, a first data field of a computing system of an issuer data structure;

determining, by the one or more processors, a deviation between the first data field and a uniform data field of the uniform interface;

conveying, by the one or more processors, an indication to a data enricher, the indication comprising the first data field and an indication of a source of the data field, the source indicative of a location of enriched data, the conveyance responsive to determining the deviation; and updating, by the one or more processors responsive to a receipt of the enriched data from the data enricher, the uniform data field with the enriched data to correspond to the nested data structure.

15. The computer-implemented method of claim 9, wherein the data fields comprise a program entity comprising one or more data fields associated with a card program, and comprising:

presenting, by the one or more processors, via a user interface based on a receipt of the credentials:

the one or more data fields; and a balance of the electronic ledger associated with one or more cards associated with the card program, wherein the credentials correspond to the program entity, one or more card programs are associated with one or more of the issuing processor systems, the credentials corresponding to a subset of the one or more card programs.

* * * * *